US012092992B2

(12) United States Patent
Itabashi et al.

(10) Patent No.: US 12,092,992 B2
(45) Date of Patent: Sep. 17, 2024

(54) DEVELOPING CARTRIDGE INCLUDING DEVELOPING ROLLER AND COUPLING

(71) Applicant: BROTHER KOGYO KABUSHIKI KAISHA, Nagoya (JP)

(72) Inventors: Nao Itabashi, Nagoya (JP); Hideshi Nishiyama, Owariasahi (JP); Yasuo Fukamachi, Nagoya (JP)

(73) Assignee: BROTHER KOGYO KABUSHIKI KAISHA, Aichi (JP)

( * ) Notice: Subject to any disclaimer, the term of this patent is extended or adjusted under 35 U.S.C. 154(b) by 0 days.

(21) Appl. No.: 18/313,434

(22) Filed: May 8, 2023

(65) Prior Publication Data

US 2023/0393521 A1 Dec. 7, 2023

Related U.S. Application Data

(63) Continuation of application No. 17/332,275, filed on May 27, 2021, now Pat. No. 11,747,765, which is a (Continued)

(30) Foreign Application Priority Data

Aug. 31, 2011 (JP) ................................ 2011-190041

(51) Int. Cl.
*G03G 21/18* (2006.01)
*G03G 15/08* (2006.01)
*G03G 21/16* (2006.01)

(52) U.S. Cl.
CPC ..... *G03G 21/1867* (2013.01); *G03G 15/0889* (2013.01); *G03G 21/1676* (2013.01); (Continued)

(58) Field of Classification Search
CPC ........... G03G 15/0863; G03G 21/1857; G03G 21/1875; G03G 21/1892; G03G 15/0889; (Continued)

(56) References Cited

U.S. PATENT DOCUMENTS 3,800,743 A 4/1974 Egnaczak
5,053,816 A 10/1991 Takahashi
(Continued)

FOREIGN PATENT DOCUMENTS

CN 1828446 A 9/2006
CN 200962188 Y 10/2007
(Continued)

OTHER PUBLICATIONS

Office Action issued in related European application 22155550.1, dated Sep. 20, 2023.

(Continued)

*Primary Examiner* — Erika J. Villaluna
(74) *Attorney, Agent, or Firm* — Merchant & Gould P.C.

(57) ABSTRACT

In a developing cartridge, a first supporting member is attached to a housing and has a first developing supporting portion and a driving-force-receiving-member supporting portion, the first developing supporting portion being configured to rotatably support a first part of a rotational shaft, the driving-force-receiving-member supporting portion being configured to rotatably support a driving-force-receiving member. The second supporting member is attached to the housing and has a second developing supporting portion and a detection-rotational-body supporting portion, the second developing supporting portion being configured to rotatably support a second part of the rotational shaft, the detection-rotational-body supporting portion being configured to rotatably support a detection rotational body.

20 Claims, 10 Drawing Sheets

Related U.S. Application Data continuation of application No. 16/989,597, filed on Aug. 10, 2020, now Pat. No. 11,022,936, which is a continuation of application No. 16/750,119, filed on Jan. 23, 2020, now Pat. No. 10,768,550, which is a continuation of application No. 16/365,928, filed on Mar. 27, 2019, now Pat. No. 10,571,828, which is a continuation of application No. 15/668,085, filed on Aug. 3, 2017, now Pat. No. 10,310,413, which is a continuation of application No. 15/344,324, filed on Nov. 4, 2016, now Pat. No. 9,785,093, which is a continuation of application No. 15/042,765, filed on Feb. 12, 2016, now Pat. No. 9,494,914, which is a continuation of application No. 14/644,333, filed on Mar. 11, 2015, now Pat. No. 9,557,684, which is a continuation of application No. 13/598,895, filed on Aug. 30, 2012, now Pat. No. 9,008,522.

(52) U.S. Cl.
CPC ....... *G03G 21/1857* (2013.01); *G03G 21/186* (2013.01); *G03G 21/1896* (2013.01); *G03G 15/0865* (2013.01); *G03G 15/0867* (2013.01)

(58) Field of Classification Search
CPC ............. G03G 21/186; G03G 21/1867; G03G 21/1871; G03G 21/1896
See application file for complete search history.

(56) References Cited

U.S. PATENT DOCUMENTS

| | | | |
|---|---|---|---|
| 5,430,780 | A | 7/1995 | Takeda et al. |
| 5,583,618 | A | 12/1996 | Takeuchi et al. |
| 5,642,187 | A | 6/1997 | Nomura et al. |
| 6,298,202 | B1 | 10/2001 | Fushiya et al. |
| 6,654,583 | B2 | 11/2003 | Suzuki et al. |
| 6,792,217 | B2 | 9/2004 | Nishino et al. |
| 7,027,756 | B2 | 4/2006 | Hoshi et al. |
| 7,076,179 | B2 | 7/2006 | Nakazato |
| 7,218,869 | B2 | 5/2007 | Nakazato |
| 7,418,214 | B2 | 8/2008 | Yoshida et al. |
| 7,512,347 | B2 | 3/2009 | Suzuki et al. |
| 7,574,148 | B2 | 8/2009 | Igarashi et al. |
| 7,613,414 | B2 | 11/2009 | Kamimura |
| 7,953,330 | B2 | 5/2011 | Ishikawa |
| 7,965,962 | B2 | 6/2011 | Mori |
| 7,970,293 | B2 | 6/2011 | Ishikawa et al. |
| 7,978,997 | B2 | 7/2011 | Tokuda |
| 8,009,996 | B2 | 8/2011 | Ishikawa |
| 8,090,272 | B2 | 1/2012 | Ishikawa |
| 8,185,014 | B2 | 5/2012 | Kamimura |
| 8,457,525 | B2 | 6/2013 | Kamimura |
| 8,463,145 | B2 | 6/2013 | Ukai et al. |
| 8,913,903 | B2 | 12/2014 | Hamaya |
| 8,923,709 | B2 | 12/2014 | Itabashi et al. |
| 9,008,522 | B2 | 4/2015 | Itabashi et al. |
| 9,110,441 | B2 | 8/2015 | Shiraki et al. |
| 9,395,684 | B2 | 7/2016 | Itabashi et al. |
| 9,494,914 | B2 | 11/2016 | Itabashi et al. |
| 9,557,684 | B2 | 1/2017 | Itabashi et al. |
| 9,785,093 | B2 | 10/2017 | Itabashi et al. |
| 9,846,387 | B2 | 12/2017 | Itabashi et al. |
| 10,310,413 | B2 | 6/2019 | Itabashi et al. |
| 2003/0185579 | A1 | 10/2003 | Nishino et al. |
| 2004/0223772 | A1 | 11/2004 | Nakazato |
| 2005/0117935 | A1 | 6/2005 | Hoshi et al. |
| 2005/0163530 | A1 | 7/2005 | Miller |
| 2006/0034625 | A1 | 2/2006 | Kajikawa |
| 2006/0159487 | A1 | 7/2006 | Choi et al. |
| 2006/0193646 | A1 | 8/2006 | Suzuki et al. |
| 2006/0210285 | A1 | 9/2006 | Nakazato |
| 2007/0009281 | A1 | 1/2007 | Sato et al. |
| 2007/0059018 | A1 | 3/2007 | Tokuda |
| 2007/0122165 | A1 | 5/2007 | Igarashi et al. |
| 2007/0122176 | A1 | 5/2007 | Sato |
| 2007/0140709 | A1 | 6/2007 | Yoshida et al. |
| 2007/0140725 | A1 | 6/2007 | Kamimura |
| 2007/0147852 | A1 | 6/2007 | Aratachi |
| 2007/0223962 | A1 | 9/2007 | Shiraki |
| 2008/0075506 | A1 | 3/2008 | Sato |
| 2008/0205911 | A1 | 8/2008 | Ishikawa et al. |
| 2008/0205928 | A1 | 8/2008 | Ishikawa |
| 2008/0205931 | A1 | 8/2008 | Ishikawa |
| 2008/0223173 | A1 | 9/2008 | Ishikawa |
| 2008/0317509 | A1 | 12/2008 | Mori |
| 2009/0052911 | A1 | 2/2009 | Richey et al. |
| 2009/0169256 | A1 | 7/2009 | Kamimura et al. |
| 2009/0175652 | A1 | 7/2009 | Kamimura |
| 2010/0189466 | A1 | 7/2010 | Otani |
| 2010/0232815 | A1 | 9/2010 | Zheng |
| 2011/0064461 | A1 | 3/2011 | Ishii et al. |
| 2011/0158701 | A1 | 6/2011 | Sato |
| 2011/0206407 | A1 | 8/2011 | Mushika et al. |
| 2011/0243578 | A1 | 10/2011 | Ukai et al. |
| 2012/0051795 | A1 | 3/2012 | Mushika et al. |
| 2012/0207512 | A1 | 8/2012 | Kamimura |
| 2013/0051813 | A1 | 2/2013 | Itabashi et al. |
| 2013/0051814 | A1 | 2/2013 | Itabashi et al. |
| 2013/0051816 | A1 | 2/2013 | Itabashi |
| 2013/0051833 | A1 | 2/2013 | Itabashi et al. |
| 2013/0084081 | A1 | 4/2013 | Itabashi et al. |
| 2013/0084082 | A1 | 4/2013 | Itabashi et al. |
| 2013/0084083 | A1 | 4/2013 | Itabashi et al. |
| 2013/0084084 | A1 | 4/2013 | Itabashi et al. |
| 2013/0177326 | A1 | 7/2013 | Hamaya |
| 2014/0086613 | A1 | 3/2014 | Itabashi et al. |
| 2018/0181022 | A1 | 6/2018 | Itabashi |
| 2022/0253003 | A1 | 8/2022 | Itabashi et al. |

FOREIGN PATENT DOCUMENTS

| | | | |
|---|---|---|---|
| CN | 101256379 | A | 9/2008 |
| CN | 101256382 | A | 9/2008 |
| CN | 101256383 | A | 9/2008 |
| CN | 201207130 | Y | 3/2009 |
| CN | 201464807 | U | 5/2010 |
| CN | 201489284 | U | 5/2010 |
| CN | 102163029 | A | 8/2011 |
| CN | 102207724 | A | 10/2011 |
| CN | 102968023 | B | 2/2015 |
| CN | 102968029 | B | 3/2015 |
| EP | 1696284 | A2 | 8/2006 |
| EP | 1950625 | A2 | 7/2008 |
| EP | 2194431 | A2 | 6/2010 |
| EP | 2 290 471 | A1 | 3/2011 |
| EP | 2365402 | A2 | 9/2011 |
| JP | S63-118042 | U | 7/1988 |
| JP | H02-78949 | U | 6/1990 |
| JP | H02-262168 | A | 10/1990 |
| JP | H03-212656 | A | 9/1991 |
| JP | H03-279965 | A | 12/1991 |
| JP | 4-31156 | U | 3/1992 |
| JP | H04-191773 | A | 7/1992 |
| JP | H04-112263 | U | 9/1992 |
| JP | H04-114057 | U | 10/1992 |
| JP | 06-202403 | A | 7/1994 |
| JP | H07-160173 | A | 6/1995 |
| JP | 09-171340 | A | 6/1997 |
| JP | 09-190136 | A | 7/1997 |
| JP | H11-84850 | A | 3/1999 |
| JP | 2001222204 | A | 8/2001 |
| JP | 2002-169449 | A | 6/2002 |
| JP | 2003-271039 | A | 9/2003 |
| JP | 2004-286951 | A | 10/2004 |
| JP | 2005-164751 | A | 6/2005 |
| JP | 2006-235236 | A | 9/2006 |
| JP | 2006-267994 | A | 10/2006 |
| JP | 2006-337401 | A | 12/2006 |
| JP | 2007-079284 | A | 3/2007 |
| JP | 2007-093753 | A | 4/2007 |
| JP | 2007-148285 | A | 6/2007 |

(56) References Cited

FOREIGN PATENT DOCUMENTS

| | | | |
|---|---|---|---|
| JP | 2007-164095 | A | 6/2007 |
| JP | 2007-256663 | A | 10/2007 |
| JP | 2008-76888 | A | 4/2008 |
| JP | 2008-216391 | A | 9/2008 |
| JP | 2008-216392 | A | 9/2008 |
| JP | 2008-216393 | A | 9/2008 |
| JP | 2009-003375 | A | 1/2009 |
| JP | 2009-162912 | A | 7/2009 |
| JP | 2009-175293 | A | 8/2009 |
| JP | 2009-180984 | A | 8/2009 |
| JP | 2009-223017 | A | 10/2009 |
| JP | 2009-288549 | A | 12/2009 |
| JP | 2010-039437 | A | 2/2010 |
| JP | 2011-013323 | A | 1/2011 |
| JP | 2011-075986 | A | 4/2011 |
| JP | 2011-215374 | A | 10/2011 |

OTHER PUBLICATIONS

Apr. 5, 2019—U.S. Non-Final Office Action—U.S. Appl. No. 16/263,224.
Feb. 8, 2019—(EP) Office Action—App 16165040.3.
Oct. 25, 2018—U.S. Notice of Allowance—U.S. Appl. No. 15/820,203.
Dec. 25, 2018—(CN) Notification of the First Office Action—App 201610204572.0, Eng Tran.
Dec. 25, 2018—(CN) Notification of the First Office Action—App 201610204590.9, Eng Tran.
Dec. 25, 2018—(CN) Notification of the First Office Action—App 201610206001.0, Eng Tran.
Oct. 18, 2018—(EP) Office Action—App 16165040.3.
Aug. 28, 2018—(CN) Notification of the First Office Action—App 201510088561.6, Eng Tran.
Aug. 6, 2018—U.S. Notice of Allowance—U.S. Appl. No. 15/428,272.
Sep. 14, 2018—U.S. Notice of Allowance—U.S. Appl. No. 15/820,203.
Jul. 20, 2018—(CN) Notification of First Office Action—App 201510048294.X, Eng Tran.
Jul. 20, 2018—(CN) Notification of First Office Action—App 201510049957.X, Eng Tran.
Aug. 3, 2018—(CN) Notification of First Office Action—App 201510024679.2, Eng Tran.
Aug. 3, 2018—(CN) Notification of First Office Action—App 201510024804.X. Eng Tran.
Jun. 6, 2018—(CA) Office Action—App 2,846,368.
Jun. 1, 2018—U.S. Non-Final Office Action—U.S. Appl. No. 15/884,870.
Jan. 29, 2018—U.S. Non-Final Office Action—U.S. Appl. No. 15/820,203.
Aug. 9, 2017—U.S. Notice of Allowance—U.S. Appl. No. 15/363,985.
Aug. 22, 2017—(JP) Office Action—App 2016-134837, Eng Tran.
International Search Report and Written Opinion dated Oct. 23, 2012, PCT/JP2012/071955.
Extended EP Search Report dated Mar. 5, 2013, EP Appln. 12182298.5.
Extended EP Search Report dated Apr. 17, 2013, EP Appln. 12182300.9.
JP Office Action dated Jul. 23, 2023, JP Appln. 2011-190035, English translation.
Ex Parte Quayle issued in U.S. Appl. No. 13/598,859 mailed Jan. 24, 2014.
CN Notification of the First Office Action dated Mar. 5, 2014, CN Appln. 201210324350.4, English translation.
International Preliminary Report on Patentability dated Mar. 13, 2014 (dated Mar. 4, 2014), PCTIJP2012/071955.
CN Notification of the First Office Action dated Mar. 5, 2014, CN Appln. 201210324506.9, English translation.
Notice of Allowance issued in U.S. Appl. No. 13/598,717 dated Apr. 7, 2014.
CN Notification of the First Office Action dated Mar. 25, 2014, CN Appln. 201210324571.1, English translation.
CN Notification of the First Office Action dated Apr. 1, 2014, CN Appln. 201210324573.0, English translation.
Jun. 5, 2014—U.S. Non-Final Office Action—U.S. Appl. No. 13/598,708.
Jun. 19, 2014—U.S. Non-Final Office Action—U.S. Appl. No. 13/599,157.
Jul. 17, 2014—U.S. Notice of Allowance—U.S. Appl. No. 13/598,859.
Aug. 27, 2014—(EP) Extended Search Report—App 12182301.7.
Oct. 2, 2014—(EP) Extended Search Report—App 12182299.3.
Oct. 16, 2014—U.S. Final Office Action—U.S. Appl. No. 13/599,157.
Oct. 29, 2014—U.S. Notice of Allowance—U.S. Appl. No. 13/598,859.
Nov. 19, 2014—U.S. Notice of Allowance—U.S. Appl. No. 13/598,708.
Feb. 3, 2015—(CN) Notification of the Second Office Action—App 201210324374.X, Eng Tran.
Apr. 15, 2015—U.S. Notice of Allowance—U.S. Appl. No. 14/658,448.
Jun. 5, 2015—U.S. Non-Final Office Action—U.S. Appl. No. 14/665,763.
Jul. 28, 2015—(CN) Notification of the Third Office Action—App 201210324374.X, Eng Tran.
Jan. 21, 2016—U.S. Non-Final Office Action—U.S. Appl. No. 14/933,824.
Mar. 2, 2016—U.S. Notice of Allowance—U.S. Appl. No. 14/665,763.
Apr. 8, 2016—U.S. Non-Final Office Action—U.S. Appl. No. 15/061,551.
May 20, 2016—U.S. Non-Final Office Action—U.S. Appl. No. 14/644,333.
Jun. 23, 2016—U.S. Final Office Action—U.S. Appl. No. 14/933,824.
Aug. 22, 2016—U.S. Notice of Allowance—U.S. Appl. No. 15/061,551.
May 30, 2017—(JP) Office Action—App 2016-134837, Eng Tran.
Office Action issued in related U.S. Appl. No. 17/513,061, dated Sep. 8, 2023.
Jun. 26, 2017—U.S. Non-Final Office Action—U.S. Appl. No. 15/428,272.
Aug. 27, 2017—(JP) Office Action—App 2016-134837, Eng Tran.
Office Action issued in related U.S. Appl. No. 16/263,224, dated Apr. 5, 2019.
Office Action issued in related European Patent Application No. 16 165 040.3, dated Jun. 3, 2019.
Office Action issued in related Chinese Patent Application No. 201610204572.0, dated Jun. 20, 2019.
Office Action issued in related Chinese Patent Application No. 201610204590.9, dated Jun. 20, 2019.
Office Action issued in related Chinese Patent Application No. 201610206001.0, dated Jun. 20, 2019.
Office Action issued in related German patent application No. 11 2012 003 620.4, dated Mar. 12, 2021.
Extended European Search Report issued in related European Patent Application No. 22155550.1, dated Apr. 25, 2022.
Office Action (Notice of Reasons for Refusal) issued in related Japanese Patent Application No. 2021-149178, dated Sep. 6, 2022.
Office Action issued in related U.S. Appl. No. 17/513,061, dated Dec. 5, 2022.
Office Action issued in related U.S. Appl. No. 17/174,500, dated Dec. 23, 2022.
Office Action issued in related U.S. Appl. No. 17/820,292, dated Mar. 31, 2023.
Office Action issued in related U.S. Appl. No. 18/067,827, dated Sep. 28, 2023.
Final Office Action issued in related U.S. Appl. No. 17/513,061, dated Apr. 26, 2023.
Office Action issued in related U.S. Appl. No. 17/820,292, Feb. 26, 2024.

115(116)

116(115)

DEVELOPING CARTRIDGE INCLUDING DEVELOPING ROLLER AND COUPLING

CROSS REFERENCE TO RELATED APPLICATION

This application is a continuation of U.S. patent application Ser. No. 17/332,275, filed May 27, 2021, now U.S. Pat. No. 11,747,765, which is a continuation of U.S. patent application Ser. No. 16/989,597, filed Aug. 10, 2020, now U.S. Pat. No. 11,022,936, issued, Jun. 1, 2021, which is a continuation of U.S. patent application Ser. No. 16/750,119, filed Jan. 23, 2020, now U.S. Pat. No. 10,768,550, issued Sep. 8, 2020, which is a continuation of U.S. patent application Ser. No. 16/365,928, filed Mar. 27, 2019, now U.S. Pat. No. 10,571,828, issued Feb. 25, 2020, which is a continuation of U.S. patent application Ser. No. 15/668,085, filed Aug. 3, 2017, now U.S. Pat. No. 10,310,413, issued Jun. 4, 2019, which is a continuation of U.S. patent application Ser. No. 15/344,324, filed Nov. 4, 2016, now U.S. Pat. No. 9,785,093 B2, issued Oct. 10, 2017, which is a continuation of U.S. patent application Ser. No. 15/042,765, filed Feb. 12, 2016, now U.S. Pat. No. 9,494,914 B2, issued Nov. 15, 2016, which is a continuation of U.S. patent application Ser. No. 14/644,333, filed Mar. 11, 2015, now U.S. Pat. No. 9,557,684 B2, issued Jan. 31, 2017, which is a continuation of U.S. patent application Ser. No. 13/598,895, filed on Aug. 30, 2012, now U.S. Pat. No. 9,008,522 B2, issued Apr. 14, 2015, which claims priority from Japanese Patent Application No. 2011-190041 filed Aug. 31, 2011. The contents of the above noted applications are incorporated herein by reference in their entirety.

TECHNICAL FIELD

The present invention relates to a developing cartridge for being mounted in an image forming apparatus of an electrophotographic type.

BACKGROUND

There has been conventionally known a printer of an electrophotographic type, in which a developing cartridge is detachably mountable. The developing cartridge includes a frame, various rollers including a developing roller, and a gear mechanism. The various rollers are supported in the frame. The gear mechanism is provided on an outer surface of a side wall constituting the frame.

One developing cartridge has been proposed as the above-mentioned type of developing cartridge. In this developing cartridge, the gear mechanism includes an input coupling and a detection gear. The input coupling is for receiving driving force for driving the various rollers. The detection gear is for detecting whether the developing cartridge is a new one or a used one. Support shafts, including an input coupling shaft and a developing roller shaft, protrude leftwardly from a left side wall constituting the frame. The gear mechanism is supported on the support shafts.

In order to produce this developing cartridge, the rollers, the gear mechanism, and the other members are assembled onto the frame that is provided with the support shafts.

SUMMARY

An object of the invention is to provide an improved developing cartridge that can be reduced in size and that can be prevented from being damaged.

In order to attain the above and other objects, the invention provides a developing cartridge, including: a housing; a developing roller; a driving-force-receiving member; a detection rotational body; a first supporting member; and a second supporting member. The housing is configured to accommodate developing material therein and to have a first end and a second end along a predetermined direction, a from-first-to-second direction being defined along the predetermined direction as being directed from the first end to the second end, a from-second-to-first direction being defined along the predetermined direction as being directed from the second end to the first end. The developing roller has a rotational shaft that extends in the predetermined direction and that has a first part and a second part, the first part and the second part being apart from each other in the predetermined direction, the second part being located on a downstream side relative to the first part in the from-first-to-second direction. The driving-force-receiving member is configured to receive driving force from an outside of the developing cartridge. The detection rotational body is configured to be detected by a detecting unit that is provided outside of the developing cartridge. The first supporting member is attached to the housing and has a first developing supporting portion and a driving-force-receiving-member supporting portion, the first developing supporting portion being configured to rotatably support the first part of the rotational shaft, the driving-force-receiving-member supporting portion being configured to rotatably support the driving-force-receiving member. The second supporting member is attached to the housing and has a second developing supporting portion and a detection-rotational-body supporting portion, the second developing supporting portion being configured to rotatably support the second part of the rotational shaft, the detection-rotational-body supporting portion being configured to rotatably support the detection rotational body.

BRIEF DESCRIPTION OF THE DRAWINGS

The particular features and advantages of the invention as well as other objects will become apparent from the following description taken in connection with the accompanying drawings, in which.

DETAILED DESCRIPTION

Figure 1:
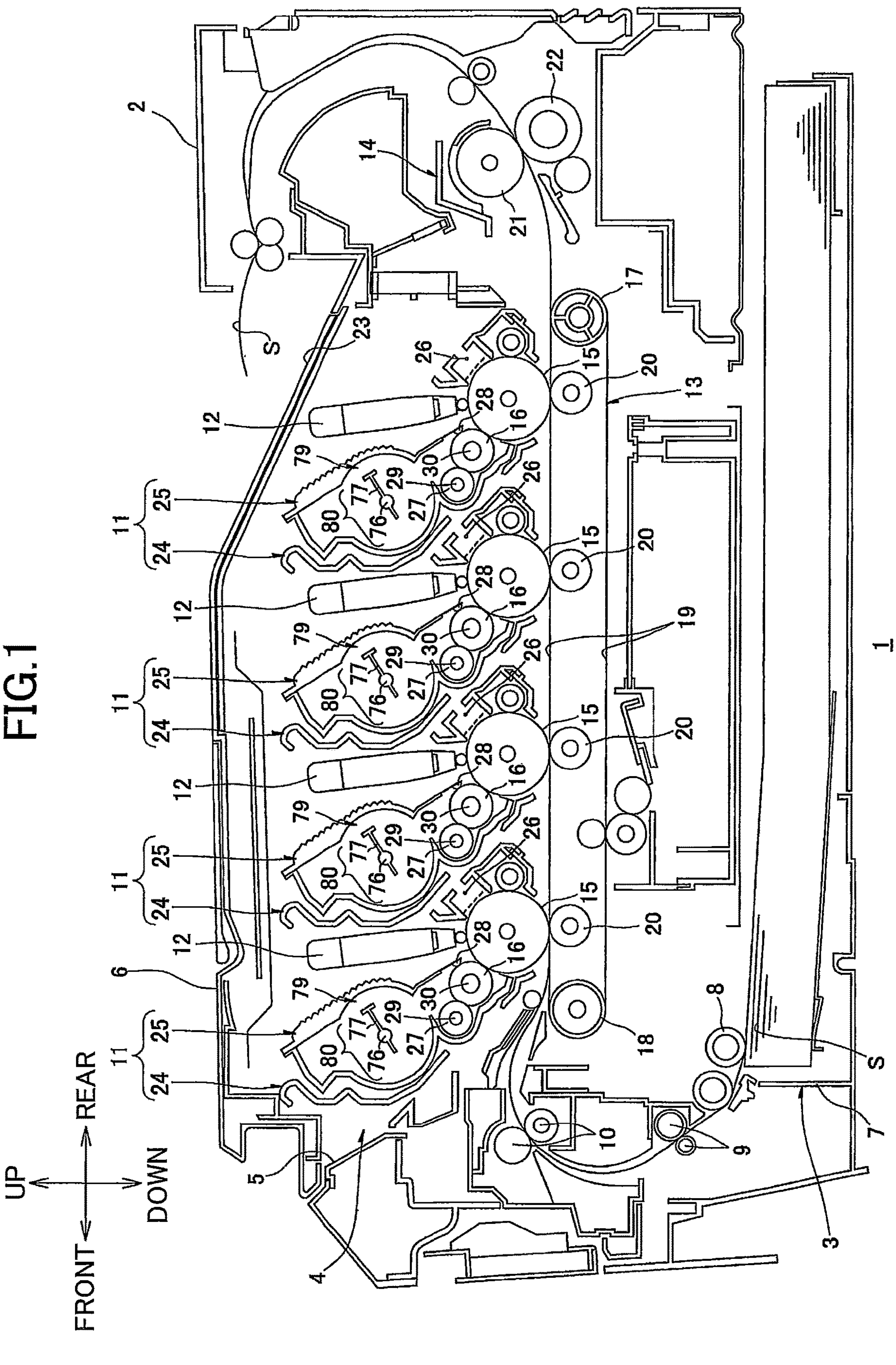
FIG. 1 is a side sectional view of a printer, in which developing cartridges according to a first embodiment of the present invention are detachably mounted.

A developing cartridge according to embodiments of the invention will be described while referring to the accompanying drawings wherein like parts and components are designated by the same reference numerals to avoid duplicating description.

A developing cartridge according to a first embodiment of the present invention will be described below with reference to FIGS. 1-7B.

1. Overall Configuration of Printer

As shown in FIG. 1, a printer 1 is a color printer of a horizontal, direct tandem type.

In the following description, at the time of referring to directions, with respect to the situation where the printer 1 is placed horizontally, the left side on paper surface of FIG. 1 is referred to as front side, and the right side on paper surface of FIG. 1 as rear side. The criteria of left and right are set when the front side of the printer 1 is seen. That is, the near side on paper surface of FIG. 1 is referred to as right side, and the back side on paper surface as left side.

The printer 1 has a main casing 2. The printer 1 has a sheet feed part 3 and an image forming part 4 inside the main casing 2. The sheet feed part 3 is for supplying a sheet of paper S to the image forming part 4. The image forming part 4 is for forming an image on the sheet of paper S supplied from the sheet feed part 3.

(1) Main Casing 2

The main casing 2 is of a box shape and has substantially a rectangular shape when seen from a side. The sheet feed part 3 and image forming part 4 are accommodated in the main casing 2. A main casing opening 5 is formed in the top surface of the main casing 2. Process cartridges 11 (to be described later) can be mounted in and detached from the main casing 2 through the main casing opening 5. A top cover 6 is swingably attached to the top surface of the main casing 2, with a rear end of the top cover 6 serving as a fulcrum.

(2) Sheet Feed Part 3

The sheet feed part 3 is detachably mounted in the bottom section of the main casing 2. The sheet feed part 3 includes a sheet feed tray 7 for accommodating sheets of paper S therein. A pick up roller 8 and a pair of sheet feed rollers 9 are provided above the front edge of the sheet feed tray 7. A pair of registration rollers 10 are provided above the sheet feed rollers 9.

The sheets of paper accommodated in the sheet feed tray 7 are fed one sheet at a time to between the registration rollers 10 according to the rotation of the pick up roller 8 and sheet feed rollers 9, and are conveyed to the image forming part 4, more specifically to between a photosensitive drum 15 (to be described later) and a conveyance belt 19 (to be described later).

(3) Image Forming Part

The image forming part 4 includes a plurality of process cartridges 11 corresponding to a plurality of colors, LED units 12, a transfer unit 13, and a fixing unit 14.

(3-1) Process Cartridge

The process cartridges 11 are each mountable in and detachable from the main casing 2. When being mounted in the main casing 2, the process cartridges 11 are spaced out from each other along the front-back direction and are arranged in parallel above the sheet feed part 3. The process cartridges 11 each include a drum cartridge 24 and a developing cartridge 25 according to the first embodiment. The developing cartridge 25 is detachably mountable on the drum cartridge 24.

The drum cartridge 24 is provided with the photosensitive drum 15 and a Scorotron-type charger 26.

The photosensitive drum 15 is formed in a cylindrical shape that is elongated in the left-right direction, and is rotatably mounted in the drum cartridge 24.

The Scorotron-type charger 26 is disposed on the rear side of the photosensitive drum 15 and is spaced apart from the photosensitive drum 15.

The developing cartridge 25 is provided with a developing roller 16.

The developing roller 16 has a developing roller shaft 30. The developing roller shaft 30 is formed of metal and extends in the left-right direction. The developing roller 16 is mounted in the rear end portion of the developing cartridge 25 so that the rear side of the developing roller 16 is exposed to the outside of the developing cartridge 25 and is in contact with the front upper side of the photosensitive drum 15.

As will be described later, the developing roller 16 is rotatably supported by a cartridge frame 31 in such a manner that both of right and left ends of the developing roller shaft 30 are rotatably supported by both of right and left side walls 36.

The developing cartridge 25 is further provided with a supply roller 27 and a layer thickness regulating blade 28. The supply roller 27 is for supplying toner to the developing roller 16. The layer thickness regulating blade 28 is for regulating the thickness of toner supplied on the developing roller 16. The developing cartridge 25 has a toner accommodating portion 79 above the supply roller 27 and the layer thickness regulating blade 28. Toner is accommodated in the toner accommodating portion 79. An agitator 80 is provided in the toner accommodating portion 79. The agitator 80 is for stirring toner accommodated in the toner accommodating portion 79.

The supply roller 27 has a supply roller shaft 29. The supply roller shaft 29 is formed of metal and extends in the left-right direction. The supply roller 27 is in contact with the front upper side of the developing roller 16.

The layer thickness regulating blade 28 is in contact with the rear upper side of the developing roller 16.

The agitator 80 has an agitator shaft 76 and an agitating blade 77. The agitator shaft 76 extends in the left-right direction. The agitating blade 77 extends radially outwardly from the agitator shaft 76.

As will be described later, the supply roller 27 and agitator 80 are rotatably supported by the cartridge frame 31 in such a manner that the supply roller shaft 29 and the agitator shaft 76 are rotatably supported by both of the right and left side walls 36.

(3-2) LED Unit

Each LED unit 12 is provided on the upper rear side of a corresponding process cartridge 11, and opposes a corresponding photosensitive drum 15 from above. Each LED unit 12 is for exposing a corresponding photosensitive drum 15 to light based on prescribed image data.

(3-3) Transfer Unit

The transfer unit 13 is disposed above the sheet feed part 3 and below the process cartridges 11, and is arranged in the front-to-rear direction. The transfer unit 13 includes: a drive roller 17; a follow roller 18; and the conveyance belt 19. The drive roller 17 and follow roller 18 are spaced apart from each other in the front-to-rear direction. The conveyance belt 19 are wound around the drive roller 17 and follow roller 18 such that the conveyance belt 19 opposes the photosensitive drums 15 from below and the upper part of the conveyance belt 19 contacts the photosensitive drums 15. When the drive roller 17 is driven to rotate, the conveyance belt 19 moves circumferentially so that the upper part of the conveyance belt 19 contacting the photosensitive drums 15 moves from the front to the rear.

The transfer unit 13 has four transfer rollers 20, which oppose the photosensitive drums 15, respectively, with the upper part of the conveyance belt 19 sandwiched therebetween.

(3-4) Fixing Unit

The fixing unit 14 is disposed on the rear side of the transfer unit 13, and includes a heating roller 21 and a pressure roller 22. The pressure roller 22 is pressed against the heating roller 21.

(4) Image Forming Operation

Toner in the developing cartridge 25 is supplied to the supply roller 27, and is then supplied to the developing roller 16. Toner is triboelectrically charged to positive polarity between the supply roller 27 and the developing roller 16.

As the developing roller 16 rotates, toner supplied on the developing roller 16 is regulated in thickness by the layer thickness regulating blade 28. As a result, toner is borne on the surface of the developing roller 16 as a thin toner layer of a uniform thickness.

A surface of each photosensitive drum 15 is uniformly charged by the corresponding Scorotron-type charger 26, and is then exposed to light by the LED unit 12. As a result, an electrostatic latent image is formed on the basis of the image data. Then, toner supported on the corresponding developing roller 16 is supplied to the electrostatic latent image on the surface of the photosensitive drum 15. As a result, a toner image (developer image) is borne on the surface of the photosensitive drum 15.

The sheet of paper S supplied from the sheet feed part 3 is conveyed by the conveyance belt 19 from the front to the rear. When the sheet S passes between each photosensitive drum 15 and each transfer roller 20 (each transfer position), the toner image of each color is sequentially transferred to the paper sheet S, and a color image is formed as a result.

The color image, which is transferred onto the sheet S in the transfer unit 13 in the above-described manner, is then heated and pressed while the sheet S passes between the heating roller 21 and the pressure roller 22. As a result, the color image is thermally fixed onto the paper sheet S.

Thereafter, the sheet S is conveyed through a U turn path to the upper front side, and is finally discharged onto a discharge tray 23 that is provided on the top cover 6.

2. Details of Developing Cartridge

Figure 2:
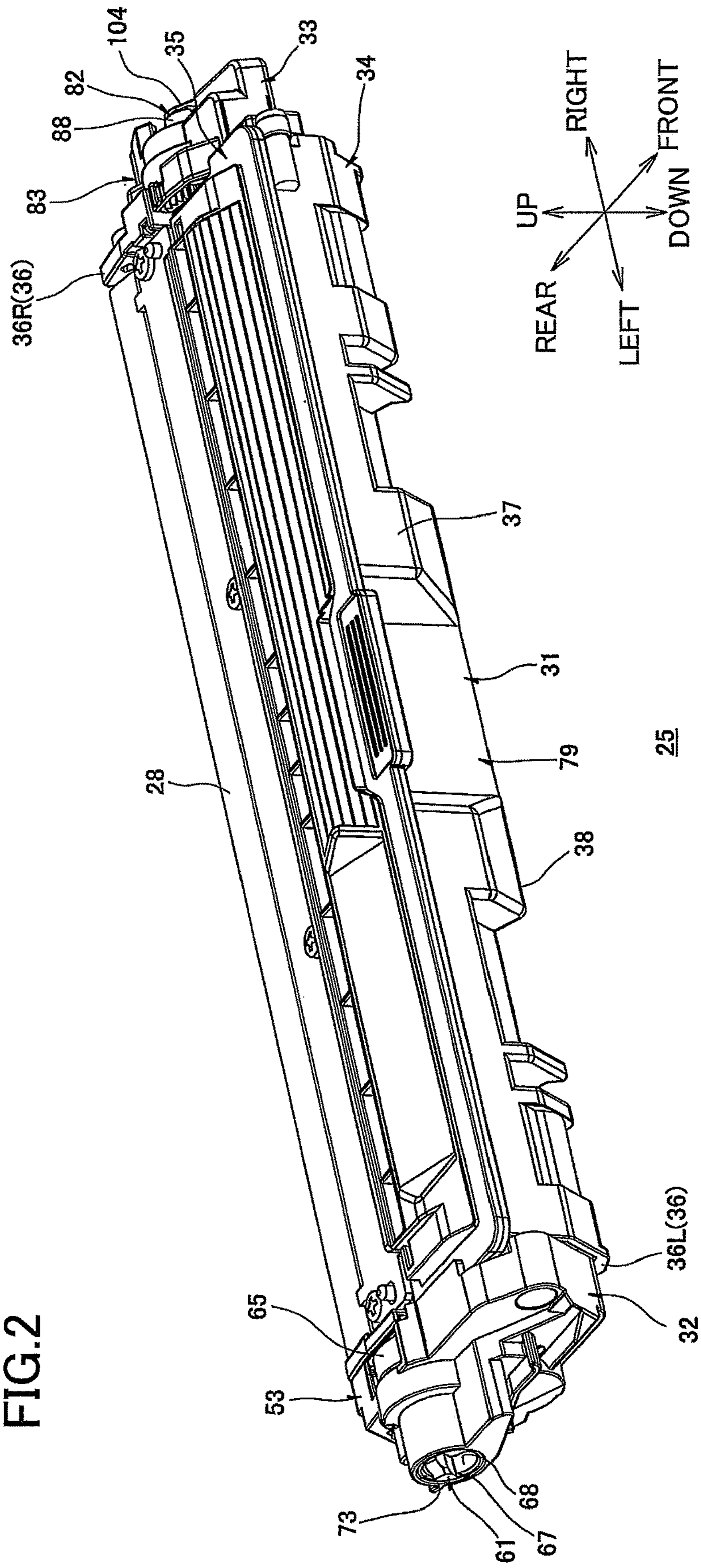
FIG. 2 is a perspective view from an upper left side of the developing cartridge shown in FIG. 1.
Figure 3:
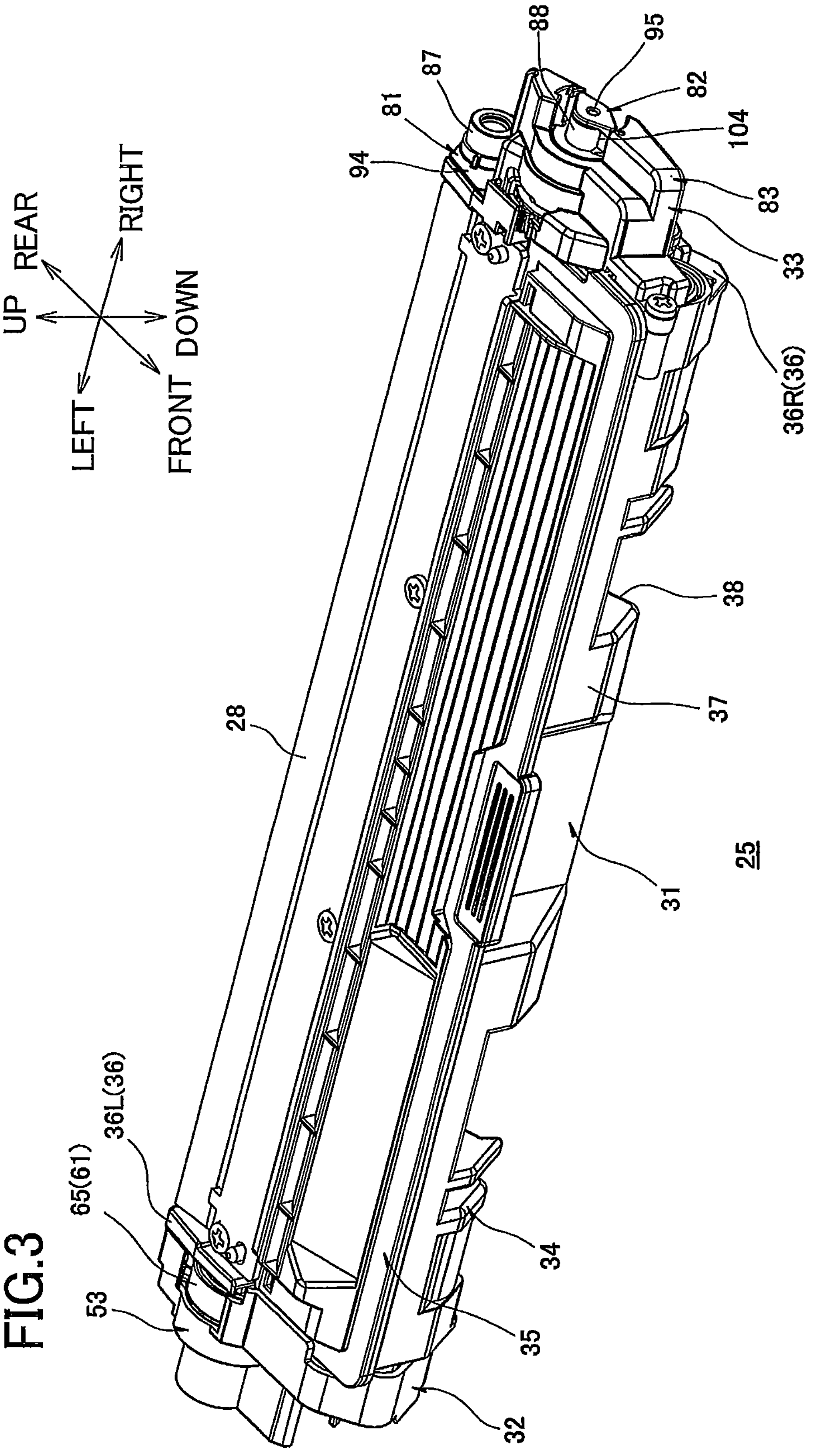
FIG. 3 is a perspective view from an upper right side of the developing cartridge.

As shown in FIGS. 2 and 3, the developing cartridge 25 is provided with a cartridge frame 31, a driving unit 32, and an electric-power supplying unit 33. The driving unit 32 is disposed on the left side of the cartridge frame 31, while the electric-power supplying unit 33 is disposed on the right side of the cartridge frame 31.

Incidentally, at the time of describing the developing cartridge 25 and referring to directions, a side on which the developing roller 16 is disposed is referred to as the rear side of the developing cartridge 25, and a side on which the layer thickness regulating blade 28 is disposed is referred to as upper side. That is, the up-down and front-back directions associated with the developing cartridge 25 are different from the up-down and front-back directions associated with the printer 1. The developing cartridge 25 is mounted in the drum cartridge 24 and the printer 1 in such an orientation that the rear side of the developing cartridge 25 corresponds to a rear lower side of the printer 1, and the front side of the developing cartridge 25 corresponds to a front upper side of the printer 1.

(1) Cartridge Frame

The cartridge frame 31 is formed substantially in a box shape extending in the left-right direction. The cartridge frame 31 has a first frame 34 and a second frame 35. The first frame 34 makes up a lower side of the cartridge frame 31, and the second frame 35 makes up an upper side of the cartridge frame 31.

(1-1) First Frame

Figure 4:
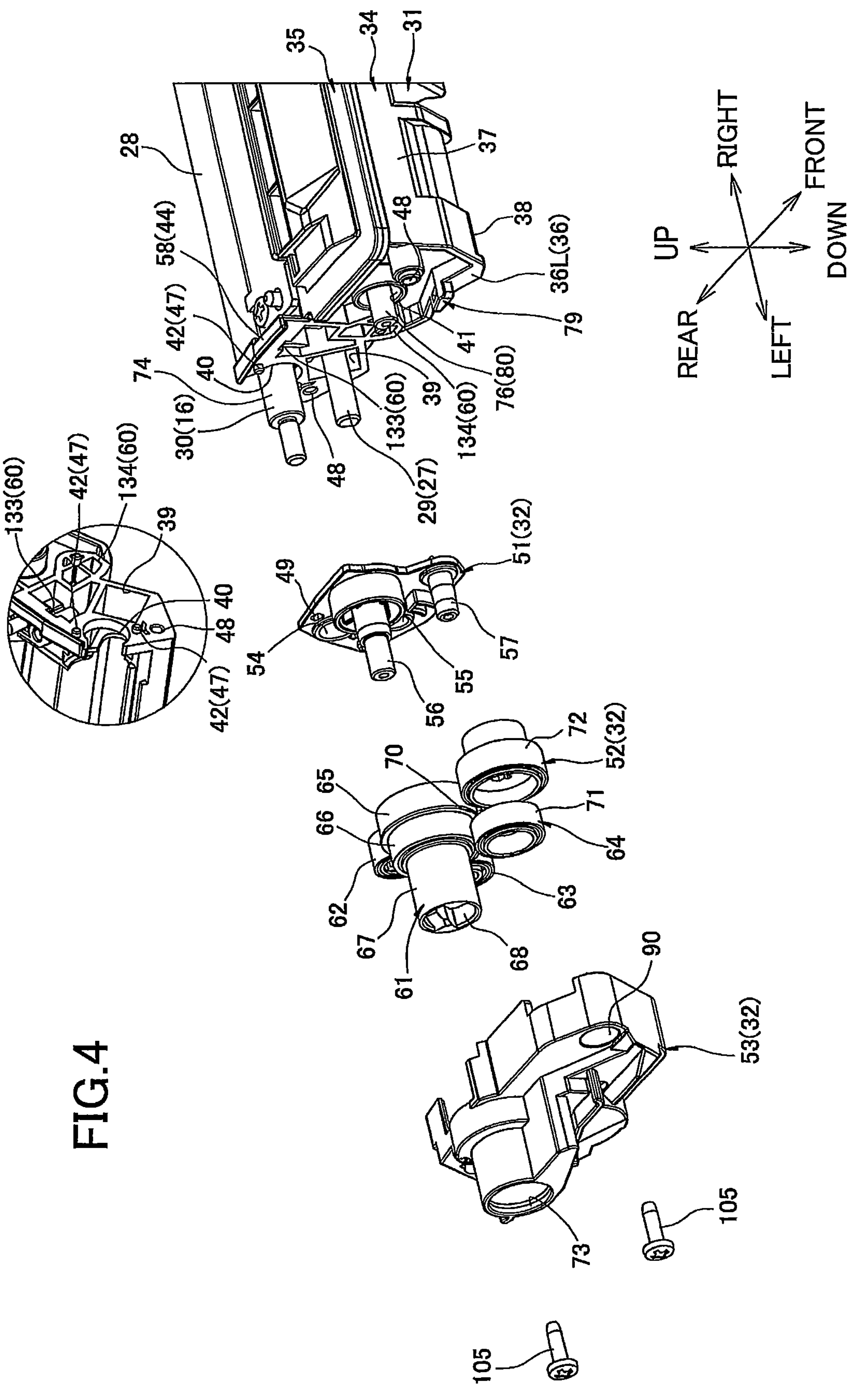
FIG. 4 is an exploded perspective view from an upper left side of a driving unit shown in FIG. 2.
Figure 5:
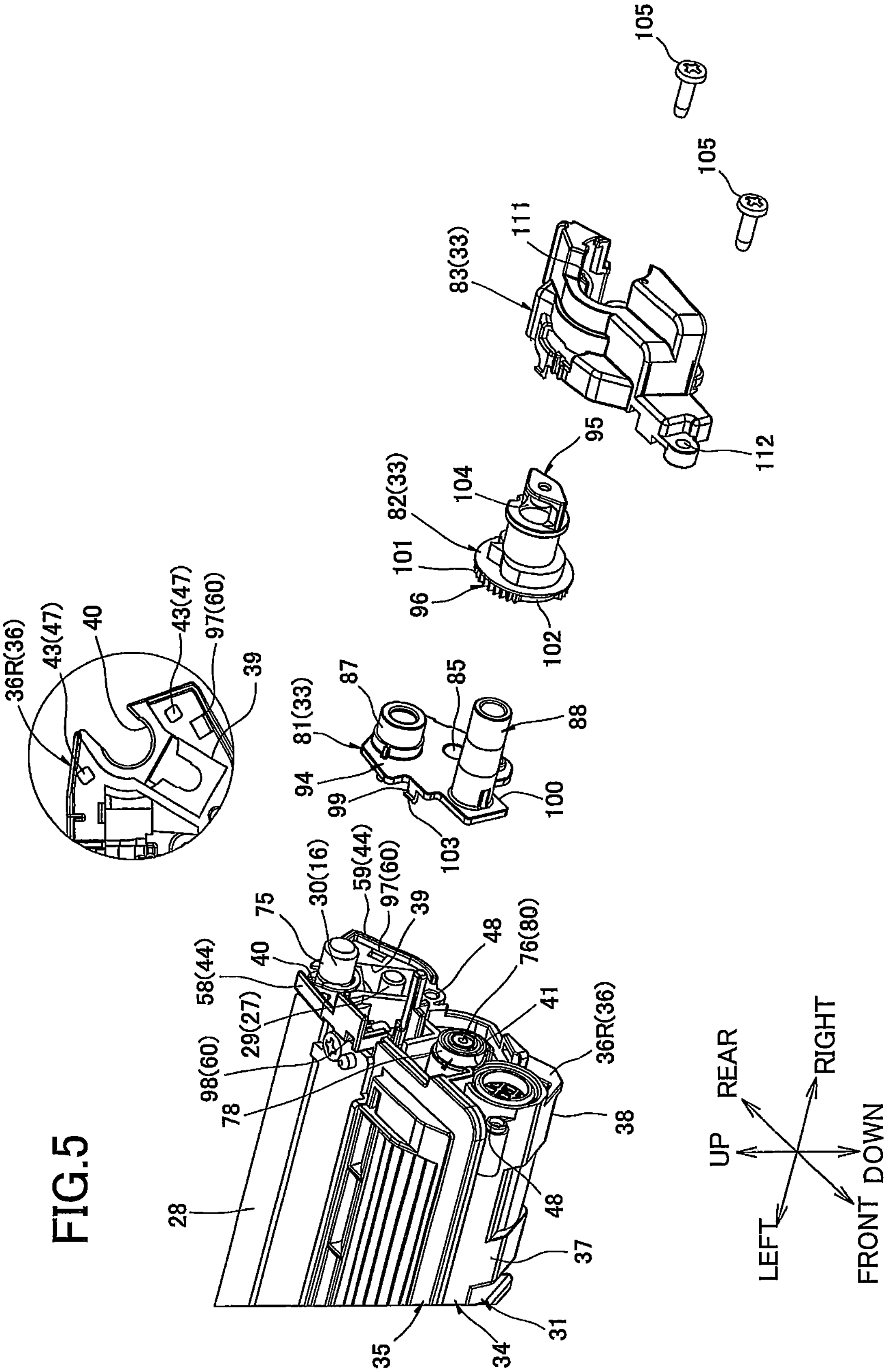
FIG. 5 is an exploded perspective view from an upper right side of an electric-power supplying unit shown in FIG. 3.

As shown in FIGS. 4 and 5, the first frame 34 integrally has a pair of left and right side walls 36, a front wall 37, and a lower wall 38, and is formed in a box shape that is open to the upper and rear sides.

The side walls 36 are both formed substantially in the shape of a rectangle extending in the up-down and front-back directions when viewed from the sides. The side walls 36 are spaced out from each other in the left-right direction and are disposed so as to face each other.

As shown in FIGS. 4 and 5, each side wall 36 is formed with a supply roller shaft exposure through-hole 39, a developing roller shaft exposure groove 40, and an agitator shaft exposure through-hole 41. The supply roller shaft exposure through-hole 39 and developing roller shaft exposure groove 40 are located on the rear side of the side wall 36, while the agitator shaft exposure through-hole 41 is located on the front side of the side wall 36.

The supply roller shaft exposure through-hole 39 is located in the lower rear end portion of the side wall 36, and penetrates the side wall 36. The supply roller shaft exposure through-hole 39 is substantially in a rectangular shape when viewed from the side. Every side of the supply roller shaft exposure through-hole 39 is longer than the diameter of the left and right end portions of the supply roller shaft 29. As shown in FIG. 4, the left end portion of the supply roller shaft 29 protrudes leftwardly and outwardly from the left side wall 36 (which will be referred to as "left side wall 36L" hereinafter) via the supply roller shaft exposure through-hole 39. As shown in FIG. 5, the right end portion of the supply roller shaft 29 is disposed in the supply roller shaft exposure through-hole 39 in the right side wall 36 (which will be referred to as "right side wall 36R" hereinafter).

As shown in FIGS. 4 and 5, the developing roller shaft exposure groove 40 is a cutout formed on the upper rear edge of the side wall 36. The developing roller shaft exposure groove 40 is substantially in a U-shape when viewed from the side, with the opening of the U shape facing upwardly and rearwardly and the bottom of the U shape facing downwardly and forwardly. The width (up-down directional length) of the developing roller shaft exposure groove 40 is larger than the diameter of the left and right end portions of the developing roller shaft 30. The left and right end portions of the developing roller shaft 30 are exposed to the outside in the left-right direction from the side walls 36 via the developing roller shaft exposure groove 40.

More specifically, as shown in FIG. 4, the left end portion of the developing roller shaft 30 that protrudes leftwardly from the left side wall 36L makes up a left exposed part 74. As shown in FIG. 5, the right end portion of the developing roller shaft 30 that protrudes rightwardly from the right side wall 36R makes up a right exposed part 75. The left exposed part 74 is one example of a first side, while the right exposed part 75 is one example of a second side.

The agitator shaft exposure through-hole 41 penetrates the side wall 36. The agitator shaft exposure through-hole 41 is substantially in a circular shape when viewed from the side. The diameter of the agitator shaft exposure through-hole 41 is larger than the diameter of the left and right end portions of the agitator shaft 76. The left and right end portions of the agitator shaft 76 protrude to the outside in the left-right direction from the side walls 36 via the agitator shaft exposure through-hole 41.

Each of the side walls 36 includes a flange part 44, engaging parts 47, screw holes 48, and fitting through-holes 60.

As shown in FIGS. 4 and 5, the flange parts 44 include upper flange parts 58 provided on the upper edges of both side walls 36, and a lower flange part 59 disposed on the lower and rear edges of the right side wall 36R. The upper flange parts 58 are formed continuously with the top edges of the side walls 36. The upper flange parts 58 have a generally flat plate shape and protrude outward in respective left and right directions. The upper flange part 58 formed on the right side wall 36R also has a front portion that protrudes farther rightward than the rear portion. The lower flange part 59 is formed continuously with the bottom and rear edges of the right side wall 36R on the rear portion thereof. The lower flange part 59 appears generally L-shaped in a side view and protrudes rightward from the right side wall 36R.

The engaging parts 47 include a pair of wall-side protruding parts 42 disposed on the left side wall 36L, and a pair of wall-side recessed parts 43 disposed on the right side wall 36R.

As shown in FIG. 4, the wall-side protruding parts 42 are provided on the left side wall 36L at positions on diametrically opposing sides of the developing roller shaft exposure groove 40. More specifically, one of the wall-side protruding parts 42 is disposed above the developing roller shaft exposure groove 40 and the other below the developing roller shaft exposure groove 40. The wall-side protruding parts 42 have a generally columnar shape and protrude leftward from the left surface of the left side wall 36L.

As shown in FIG. 5, the wall-side recessed parts 43 are provided on the right side wall 36R at positions on diametrically opposing sides of the developing roller shaft exposure groove 40. More specifically, one of the wall-side recessed parts 43 is formed above the developing roller shaft exposure groove 40 and the other below the developing roller shaft exposure groove 40. The wall-side recessed parts 43 are generally rectangular in a side view and are recessed leftward into the right surface of the right side wall 36R.

Two of the screw holes 48 are formed in each of the side walls 36. The screw holes 48 are generally circular in a side view. More specifically, in the left side wall 36L shown in FIG. 4, one of the screw holes 48 is formed on the front side of the agitator shaft exposure through-hole 41, while the other is formed below the lower wall-side protruding part 42. In the right side wall 36R shown in FIG. 5, one of the screw holes 48 is formed on the front side of the agitator shaft exposure through-hole 41, while the other is formed below the supply roller shaft exposure through-hole 39.

Two of the fitting through-holes 60 are formed in each of the side walls 36. More specifically, in the left side wall 36L shown in FIG. 4, the fitting through-holes 60 are formed at positions corresponding to fitting protrusions 107 (see FIG. 6A) of a bearing member 51 (described later) and will be respectively referred to as an upper fitting through-hole 133 formed on the front side of the developing roller shaft exposure groove 40, and a lower fitting through-hole 134 formed on the front side of the supply roller shaft exposure through-hole 39. The upper and lower fitting through-holes 133 and 134 are generally rectangular in a side view and penetrate the left side wall 36L in the left-right direction.

In the right side wall 36R shown in FIG. 5, the fitting through-holes 60 are formed at positions corresponding to fitting protrusions 103 (see FIG. 6B) of an electrode member 81 (described later) and will be respectively referred to as a lower fitting through-hole 97 formed on the lower front side of the lower wall-side recessed part 43, and an upper fitting through-hole 98 formed in the front end portion of the upper flange part 58. The lower fitting through-hole 97 is generally rectangular in a side view and penetrates the right side wall 36R in the left-right direction. The upper fitting through-hole 98 is generally rectangular in a plan view and penetrates the left edge of the upper flange part 58 vertically.

As shown in FIGS. 2 and 3, the front wall 37 extends in the left-right direction, and spans between the front edges of the side walls 36.

The lower wall 38 extends in the left-right direction, and spans between the lower edges of the side walls 36 while being in continuity with the lower edges of the front wall 37.

(1-2) Second Frame

The second frame 35 is connected to the front portions of the both side walls 36 and to the upper edge of the front wall 37. The second frame 35 is substantially in a rectangular plate shape in a plan view. The layer thickness regulating blade 28 is attached to the rear edge of the second frame 35, and contacts the developing roller 16 from above (see FIG. 1).

(2) Driving Unit

As shown in FIGS. 2 and 4, the driving unit 32 includes a bearing member 51, a gear train 52, and a driving-side gear cover 53.

(2-1) Bearing Member

Figure 6A:
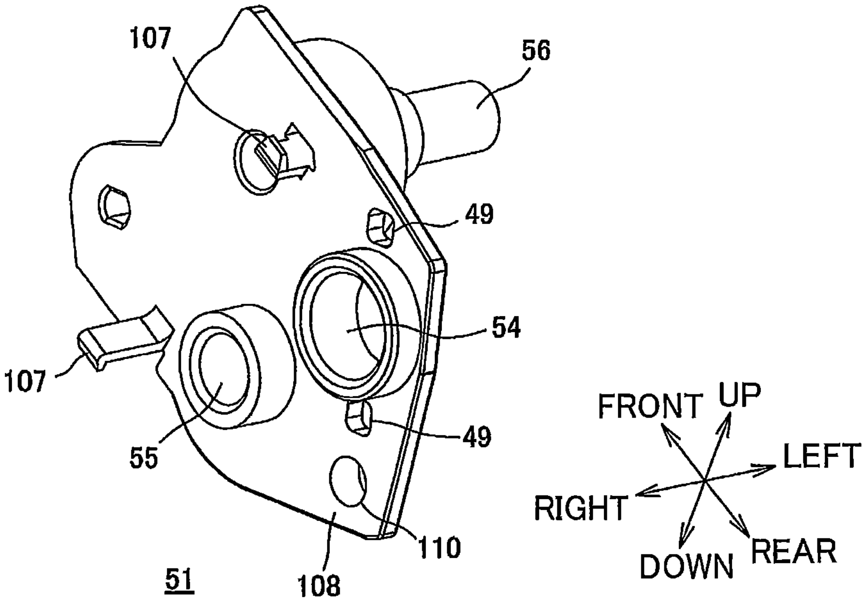
FIG. 6A is a perspective view from an upper right side of a bearing member shown in FIG. 4.

As shown in FIGS. 4 and 6A, the bearing member 51 is substantially in a rectangular plate shape when viewed from the side. The bearing member 51 is formed with a developing roller shaft support through-hole 54, a pair of bearing-side through-holes 49, a supply roller shaft support through-hole 55, a coupling support shaft 56, an idle gear support shaft 57, fitting protrusions 107, and a screw through-hole 110.

The developing roller shaft support through-hole 54 is located in the upper rear end portion of the bearing member 51 and penetrates the bearing member 51. The developing roller shaft support through-hole 54 is substantially in a circular shape when viewed from the side. The inner diameter of the developing roller shaft support through-hole 54 is substantially equal to or slightly larger than the outer diameter of the left exposed part 74 in the developing roller shaft 30.

The bearing-side through-holes 49 are formed on diametrically opposing sides of the developing roller shaft support through-hole 54 at positions corresponding to the wall-side protruding parts 42. More specifically, one bearing-side through-hole 49 is formed above the developing roller shaft support through-hole 54 and the other below the developing roller shaft support through-hole 54, as shown in FIG. 6A. The bearing-side through-holes 49 have a generally rectangular shape in a side view and penetrate the bearing member 51 in the left-right direction.

The supply roller shaft support through-hole 55 is located on the front lower side of the developing roller shaft support through-hole 54 and penetrates the bearing member 51. The supply roller shaft support through-hole 55 is substantially in a circular shape when viewed from the side. The inner diameter of the supply roller shaft support through-hole 55 is substantially equal to or slightly larger than the outer diameter of the supply roller shaft 29.

The coupling support shaft 56 is located on the front side of the developing roller shaft support through-hole 54 and on the upper side of the supply roller shaft support through-hole 55. The coupling support shaft 56 is substantially in a columnar shape and protrudes leftwardly from the left surface of the bearing member 51.

The idle gear support shaft 57 is located on the front end portion of the bearing member 51. The idle gear support shaft 57 is substantially in a columnar shape and protrudes leftwardly from the left surface of the bearing member 51.

As shown in FIG. 6A, two of the fitting protrusions 107 are provided on the bearing member 51 at positions corresponding to the upper and lower fitting through-holes 133 and 134. Specifically, the fitting protrusion 107 corresponding to the upper fitting through-hole 133 is formed on the front side of the developing roller shaft support through-hole 54 and protrudes rightward from the right surface of the bearing member 51. The fitting protrusion 107 corresponding to the upper fitting through-hole 133 has a hook-like shape, with its distal end bent upward. The fitting protrusion 107 corresponding to the lower fitting through-hole 134 is formed on the bottom edge of the bearing member 51 on the lower front side of the supply roller shaft support through-hole 55. The fitting protrusion 107 corresponding to the lower fitting through-hole 134 also protrudes rightward from the right surface of the bearing member 51 and is formed in a hook-like shape, with its distal end bent downward.

The screw through-hole 110 is formed in the bearing member 51 below the lower bearing-side through-hole 49 at a position corresponding to the screw hole 48 formed on the rear side of the left side wall 36L. The peripheral edge defining the screw through-hole 110 serves as an interposed part 108.

As will be described later in greater detail, the bearing member 51 is mounted on the left side of the left side wall 36L.

(2-2) Gear Train

As shown in FIG. 4, the gear train 52 includes a development coupling 61, a developing gear 62, a supply gear 63, the idle gear 64, a first agitator gear 72, and a second agitator gear 78 (See FIG. 5).

The development coupling 61 is substantially in a columnar shape extending in the left-right direction. The development coupling 61 is integrally provided with a large-diameter gear portion 65, a small-diameter gear portion 66, and a coupling portion 67.

The large-diameter gear portion 65 is provided in the right end portion of the development coupling 61. Gear teeth are formed on the entire periphery of the large-diameter gear portion 65.

The small-diameter gear portion 66 is smaller in diameter than the large-diameter gear portion 65, and is substantially in the shape of a column that shares the central axis with the large-diameter gear portion 65. Gear teeth are formed on the entire periphery of the small-diameter gear portion 66.

The coupling portion 67 is smaller in diameter than the small-diameter gear portion 66, and is formed substantially in the shape of a column that shares the central axis with the large-diameter gear portion 65. A coupling concave portion 68 is formed on the left-side surface of the coupling portion 67. The coupling concave portion 68 is dented rightwardly. When the developing cartridge 25 is mounted in the main casing 2, a tip end of a main-casing-side coupling (not shown) provided in the main casing 2 is inserted into the coupling concave portion 68 so as not to be rotatable relative to the coupling concave portion 68. A driving force is input to the coupling concave portion 68 through the main-casing-side coupling (not shown) from the main casing 2.

As will be described later in greater detail, the developing gear 62 is attached to the left end portion of the developing roller shaft 30 so as not to be rotatable relative to the developing roller shaft 30. The developing gear 62 is engaged with the rear side of the large-diameter gear portion 65 in the development coupling 61.

The supply gear 63 is attached to the left end portion of the supply roller shaft 29 so as not to be rotatable relative to the supply roller shaft 29. The supply gear 63 is engaged with the rear lower side of the large-diameter gear portion 65 of the development coupling 61.

The idle gear 64 is substantially in the shape of a column extending in the left-right direction. The idle gear 64 is integrally provided with a large-diameter portion 71 and a small-diameter portion 70. The large-diameter portion 71 makes up the left half of the idle gear 64, and the small-diameter portion 70 makes up the right half of the idle gear 64.

The large-diameter portion 71 is substantially in the shape of a column extending in the left-right direction.

The small-diameter portion 70 is substantially in the shape of a column that extends rightwardly from the right surface of the large-diameter portion 71 and that shares the central axis with the large-diameter portion 71. As will be described later, when the idle gear 64 is supported on the idle gear support shaft 57, the large-diameter portion 71 is engaged with the front lower side of the small-diameter gear portion 66 of the development coupling 61, and the small-diameter portion 70 is disposed on the front lower side of the large-diameter gear portion 65 of the development coupling 61, and is spaced apart from the large-diameter gear portion 65.

The first agitator gear 72 is attached to the left end portion of the agitator shaft 76 so as not to be rotatable relative to the agitator shaft 76. The first agitator gear 72 is engaged with the front upper side of the small-diameter portion 70 of the idle gear 64.

As shown in FIG. 5, the second agitator gear 78 is provided on the right side of the right side wall 36R. The second agitator gear 78 is attached to the right end portion of the agitator shaft 76 so as not to be rotatable relative to the agitator shaft 76. The number of teeth provided on the second agitator gear 78 is less than the number of teeth on the first agitator gear 72.

(2-3) Driving-Side Gear Cover

As shown in FIG. 4, the driving-side gear cover 53 is substantially in the shape of a tube, which extends in the left-right direction and whose left end portion is closed. The driving-side gear cover 53 is formed into such a size (front-back direction length and up-down direction length) that covers the development coupling 61, the supply gear 63, the idle gear 64, and the first agitator gear 72 as a whole.

The driving-side gear cover 53 is formed with a coupling exposure opening 73 and left screw insertion through-holes 90.

The coupling exposure opening 73 is located substantially at the front-back directional center of a left wall constituting the driving-side gear cover 53. The coupling exposure opening 73 penetrates the left wall of the driving-side gear cover 53, and is substantially in a circular shape when viewed from the side. The coupling exposure opening 73 exposes the left surface of the coupling portion 67 (coupling concave portion 68) to the outside.

The left screw insertion through-holes 90 are generally circular in a side view and penetrate both the front and rear (see FIGS. 4 and 7A) edges of the driving-side gear cover 53 for exposing the screw holes 48 in the left side wall 36L. The portion of the driving-side gear cover 53 constituting the periphery of the rear-side left screw insertion through-hole 90 serves as an interposing part 109 (see FIG. 7A).

As will be described later, the driving-side gear cover 53 is fixed with screws to the left side wall 36L so as to cover the development coupling 61 (except the left surface of the coupling portion 67 (coupling concave portion 68)), the supply gear 63, the idle gear 64, and the first agitator gear 72.

(3) Electric-Power Supplying Unit

As shown in FIGS. 3 and 5, the electric-power supplying unit 33 includes an electrode member 81, a new-product detection gear 82, and an electric-power supply-side gear cover 83.

(3-1) Electrode Member

Figure 6B:
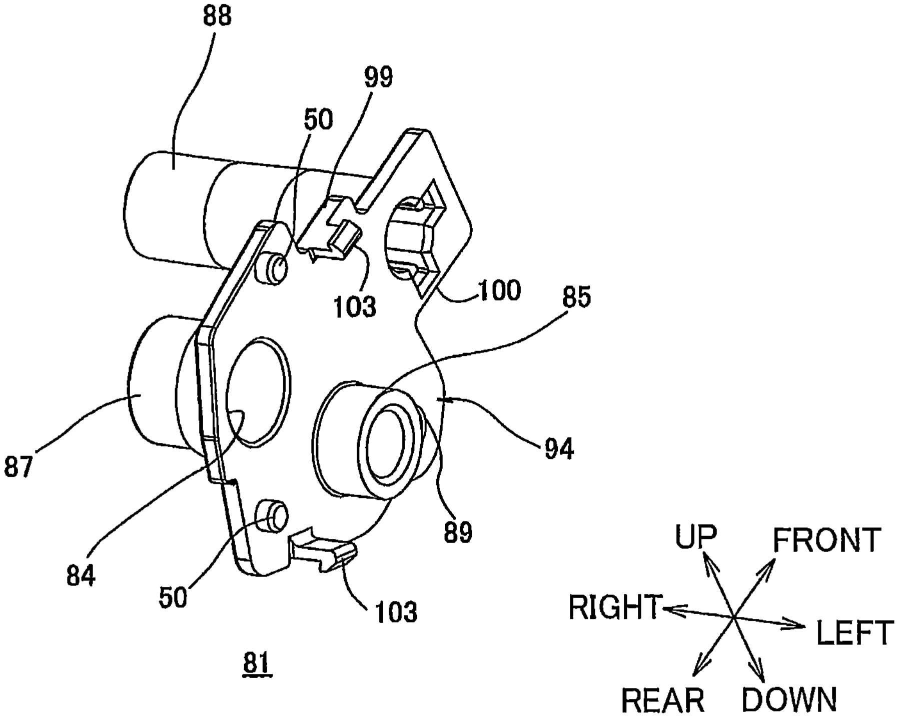
FIG. 6B is a perspective view from an upper left side of an electrode member shown in FIG. 5.

As shown in FIGS. 5 and 6B, the electrode member 81 is made of a conductive resin material (e.g., conductive polyacetal resin). The electrode member 81 has a main part 94 and a detection-gear-supporting part 88.

The main part 94 is formed substantially in the shape of a rectangular plate when viewed from the side. An upper notched part 99 is formed in the top edge of the main part 94 in the front-rear center thereof. A lower notched part 100 is formed in the lower front edge of the main part 94.

As shown in FIG. 6B, the upper notched part 99 is formed as a notch in the upper edge of the main part 94 that is substantially L-shaped in a side view. The position of the upper notched part 99 corresponds to the front portion of the upper flange part 58 provided on the right side wall 36R.

The lower notched part 100 is formed in the bottom edge of the main part 94 and is substantially L-shaped in a side view.

The main part 94 is formed with a developing roller shaft support through-hole 84, a developing roller shaft collar 87, a pair of bearing-side-protruding parts 50, a supply roller shaft support portion 85, fitting protrusions 103, and a screw through-hole 89.

The developing roller shaft support through-hole 84 is located on the upper rear end portion of the main part 94, and penetrates the main part 94. The developing roller shaft support through-hole 84 is substantially in a circular shape when viewed from the side. The inner diameter of the developing roller shaft support through-hole 84 is substantially equal to or slightly larger than the right exposed part 75 of the developing roller shaft 30 (see FIG. 5).

The developing roller shaft collar 87 is formed substantially in the shape of a cylinder that protrudes rightwardly from the peripheral edge of the developing roller shaft support through-hole 84.

The bearing-side-protruding parts 50 are disposed on diametrically opposing sides of the developing roller shaft support through-hole 84 at positions corresponding to the wall-side recessed parts 43. Specifically, one of the bearing-side-protruding parts 50 is disposed above the developing roller shaft support through-hole 84, and the other is disposed below the developing roller shaft support through-hole 84. The bearing-side-protruding parts 50 are formed in a substantially columnar shape and protrude leftward from the left surface of the main part 94.

The supply roller shaft support portion 85 is located on the front lower side of the developing roller shaft support through-hole 84. The supply roller shaft support portion 85 is substantially in the shape of a cylinder that extends leftwardly from the left surface of the main part 94. The inner diameter of the supply roller shaft support portion 85 is substantially equal to or slightly larger than the outer diameter of the supply roller shaft 29.

Two of the fitting protrusions 103 are provided on the main part 94 at positions corresponding to the lower and upper fitting through-holes 97 and 98. Specifically, the fitting protrusion 103 corresponding to the lower fitting through-hole 97 is formed on the lower rear edge of the main part 94 and protrudes leftward from the left surface of the main part 94. The fitting protrusion 103 corresponding to the lower fitting through-hole 97 has a hook-like shape, with its distal end bent downward. The fitting protrusion 103 corresponding to the upper fitting through-hole 98 is formed on the upper edge of the upper notched part 99 and protrudes leftward therefrom. The fitting protrusion 103 corresponding to the upper fitting through-hole 98 also has a hook-like shape, with its distal end bent upward.

The detection-gear-supporting part 88 is formed on the front end of the main part 94 above the lower notched part 100. The detection-gear-supporting part 88 has a general cylindrical shape and protrudes rightward from the right surface of the main part 94. The detection-gear-supporting part 88 is hollow and open on both ends. The screw through-hole 89 is formed in the electrode member 81 on the front lower side of the supply roller shaft support portion 85 at a position corresponding to the screw hole 48 formed on the rear side of the right side wall 36R. As will be described later, the portion of the electrode member 81 constituting the periphery of the screw through-hole 89 serve as an interposed part that is pinched between the right side wall 36R and the electric-power supply-side gear cover 83.

As will be described later in greater detail, the electrode member 81 is mounted on the right side of the right side wall 36R.

(3-2) New-Product Detection Gear

As shown in FIG. 5, the new-product detection gear 82 is formed substantially in the shape of a cylinder that extends in the left-right direction.

The new-product detection gear 82 is integrally provided with a tooth-missing gear 96 and a detection end portion 95.

The tooth-missing gear 96 is provided on the left end of the new-product detection gear 82. The tooth-missing gear 96 is substantially in a circular plate shape, and has a thickness in the left-right direction. Gear teeth are formed on the periphery of the tooth-missing gear 96 at its portion that makes a central angle of about 205 degrees. That is, a teeth portion 101 and a tooth-missing portion 102 are formed on the peripheral surface of the tooth-missing gear 96, with gear teeth formed in the teeth portion 101 and no gear teeth in the tooth-missing portion 102.

The detection end portion 95 is provided on the right end of the new-product detection gear 82. An opening 104 is formed in the detection end portion 95 and communicates with the internal space of the new-product detection gear 82.

A CPU (not shown) provided in the main casing 2 detects whether the detection end portion 95 (new-product detection gear 82) operates or rotates when the developing cartridge 25 is mounted in the main casing 2, whereby the CPU can detect whether the developing cartridge 25 is a new product. More specifically, when the detection end portion 95 (new-product detection gear 82) operates or rotates, the detection-gear-supporting part 88 exposed in the opening 104 contacts a main-casing-side electrode (not shown) provided in the main casing 2. As a result, electric power is supplied from the main-casing-side electrode to the detection-gear-supporting part 88. By detecting an electric signal via the detection-gear-supporting part 88, the CPU determines that the developing cartridge 25 is a new product.

(3-3) Electric-Power Supply-Side Gear Cover

As shown in FIG. 5, the electric-power supply-side gear cover 83 is substantially in the shape of a tube, which extends in the left-right direction and whose right side end is closed. The electric-power supply-side gear cover 83 is formed into such a size (front-back direction length and up-down direction length) that covers the new-product detection gear 82 and the second agitator gear 78 as a whole.

The electric-power supply-side gear cover 83 is formed with a new-product detection gear exposure opening 111 and right screw insertion through-holes 112.

The new-product detection gear exposure opening 111 is located substantially at the front-back directional center in a right wall constituting the electric-power supply-side gear cover 83. The new-product detection gear exposure opening 111 penetrates the right wall of the electric-power supply-side gear cover 83. The new-product detection gear exposure opening 111 is substantially in a circular shape when viewed from the side. The new-product detection gear exposure opening 111 exposes the detection end portion 95 of the new-product detection gear 82 to the outside.

The right screw insertion through-holes 112 are located on the front end portion and the rear lower end portion of the electric-power supply-side gear cover 83. The right screw insertion through-holes 112 penetrate the right wall constituting the electric-power supply-side gear cover 83. The right screw insertion through-holes 112 are substantially in a circular shape when viewed from the side. The right screw insertion through-holes 112 expose to the outside the corresponding screw holes 48 formed in the right side wall 36R. The portion of the electric-power supply-side gear cover 83 constituting the periphery of the rear-side right screw insertion through-hole 112 serves as an interposing part that pinches the electrode member 81 against the right side wall 36R.

As will be described later in greater detail, the electric-power supply-side gear cover 83 is fixed with screws to the right side wall 36R so as to cover the tooth-missing gear 96 of the new-product detection gear 82 and the second agitator gear 78 as a whole.

3. Assembling the Driving Unit and Electric-Power Supplying Unit in the Cartridge Frame Next, the process for assembling the driving unit 32 and electric-power supplying unit 33 to the cartridge frame 31 will be described. In this process, the driving unit 32 is assembled to the left side wall 36L from the outer left side, and the electric-power supplying unit 33 is assembled to the right side wall 36R from the outer right side.

To assemble the driving unit 32 to the left side wall 36L, first the bearing member 51 is assembled to the left side wall 36L, as illustrated in FIG. 4. The bearing member 51 is mounted on the left side wall 36L so that the left exposed part 74 is inserted through the developing roller shaft support through-hole 54, and the left end of the supply roller shaft 29 is inserted through the supply roller shaft support through-hole 55. At this time, the wall-side protruding parts 42 on the left side wall 36L engage in the corresponding bearing-side through-holes 49, thereby fixing the position of the bearing member 51 relative to the left side wall 36L. As shown in FIG. 6A, the fitting protrusions 107 also become engaged in the corresponding upper and lower fitting through-holes 133 and 134. The coupling support shaft 56 is positioned to the left of the rear edge defining the front portion of the left side wall 36L, which front portion faces the toner-accommodating portion 79. Through the above operation, the bearing member 51 is mounted on the left side wall 36L.

Next, the gear train 52 is assembled to the bearing member 51, developing roller shaft 30, supply roller shaft 29, and agitator shaft 76. Specifically, the coupling support shaft 56 is inserted from the right side into the space within the development coupling 61. As a result, the development coupling 61 is supported by and rotatable relative to the coupling support shaft 56.

Next, the developing gear 62 is mounted on the left exposed part 74 positioned farther leftward than the developing roller shaft support through-hole 54 so as to be incapable of rotating relative to the left exposed part 74. The developing gear 62 is positioned to engage the large diameter gear portion 65 of the development coupling 61 on the rear side. The supply gear 63 is also mounted on the left end of the supply roller shaft 29 positioned farther leftward than the supply roller shaft support through-hole 55 so as to be incapable of rotating relative to the supply roller shaft 29. The supply gear 63 is positioned to engage the large diameter gear portion 65 from the lower rear side. The first agitator gear 72 is also mounted on the left end of the agitator shaft 76 so as to be incapable of rotating relative to the same.

The idle gear support shaft 57 is then inserted into the space within the idle gear 64 from the right side thereof, so that the large-diameter portion 71 of the idle gear 64 engages with the small-diameter gear part 66 of the development coupling 61 from the lower front side and the small-diameter portion 70 of the idle gear 64 engages with the first agitator gear 72 from the lower rear side. Through this operation, the idle gear 64 is supported by and capable of rotating relative to the idle gear support shaft 57.

Through the above operations, the gear train 52 is assembled to the bearing member 51, developing roller shaft 30, supply roller shaft 29, and agitator shaft 76. Next, the driving-side gear cover 53 is assembled to the left side wall 36L.

The driving-side gear cover 53 is mounted on the left side wall 36L from the left side so as to cover the gear train 52 while exposing the left surface of the coupling portion 67 constituting the development coupling 61 (i.e., the coupling concave portion 68) through the coupling exposure opening 73. Further, the screw holes 48 are exposed in corresponding left screw insertion through-holes 90.

Figure 7A:
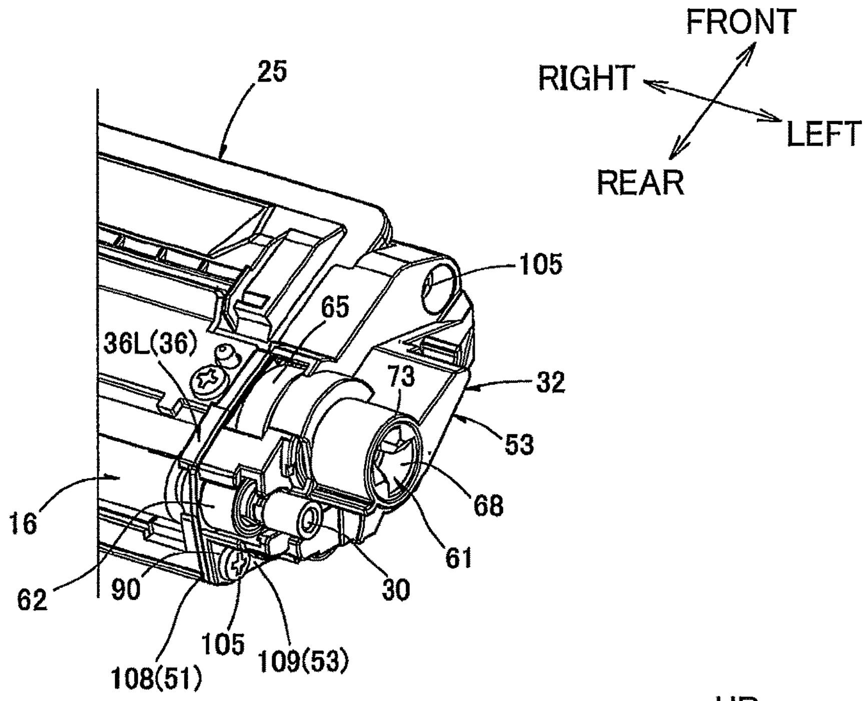
FIG. 7A is a perspective view from an upper rear side of the developing cartridge.

Two screw members 105 are inserted through the left screw insertion through-holes and screwed into the screw holes 48 to fasten the driving-side gear cover 53 to the left side wall 36L. This completes the process of assembling the driving unit 32 to the left side wall 36L. At this time, the top edge of the bearing member 51 vertically confronts the upper flange part 58 of the left side wall 36L. Further, as shown in FIG. 7A, the interposed part 108 of the bearing member 51 (see FIG. 6A) is interposed between the right surface of the interposing part 109 constituting the driving-side gear cover 53 and the left surface of the left side wall 36L constituting the rear end portion thereof.

To mount the electric-power supplying unit 33 on the right side wall 36R, first the second agitator gear 78 is assembled to the right end of the agitator shaft 76 provided on the right side of the right side wall 36R so as to be incapable of rotating relative to the agitator shaft 76, as illustrated in FIG. 5. Next, the electrode member 81 is assembled on the right side wall 36R.

The electrode member 81 is mounted on the right side wall 36R so that the right exposed part 75 is inserted through the developing roller shaft support through-hole 84 and developing roller shaft collar 87 and the right end of the supply roller shaft 29 is inserted through the supply roller shaft support portion 85. At this time, the bearing-side-protruding parts 50 on the electrode member 81 (see FIG. 6B) engage in the corresponding wall-side recessed parts 43 formed in the right side wall 36R, thereby fixing the position of the electrode member 81 relative to the right side wall 36R. In addition, the fitting protrusions 103 (see FIG. 6B) engage in the corresponding lower fitting through-hole 97 and upper fitting through-hole 98. The developing roller shaft collar 87 also covers the right exposed part 75.

Through the operation described above, the electrode member 81 is assembled on the right side wall 36R. As a result, the left exposed part 74 is rotatably supported on the developing roller shaft support through-hole 54 and the right exposed part 75 is rotatably supported on the developing roller shaft support through-hole 84. Consequently, the developing roller 16 is rotatably supported in the side walls 36. Further, both left and right ends of the supply roller shaft 29 are rotatably supported in the supply roller shaft support through-hole 55 and supply roller shaft support portion 85, respectively. Consequently, the supply roller 27 is rotatably supported in the side walls 36.

Next, the new-product detection gear 82 is assembled to the electrode member 81. To assemble the new-product detection gear 82 to the electrode member 81, the new-product detection gear 82 is fitted over the detection-gear-supporting part 88 from the right side thereof so that the teeth portion 101 engages with the second agitator gear 78 from the rear side. As a result, the new-product detection gear 82 is supported by and capable of rotating relative to the detection-gear-supporting part 88. At this time, the right end of the detection-gear-supporting part 88 is exposed in the opening 104.

Next, the electric-power-supply-side gear cover 83 is assembled to the right side wall 36R. The electric-power-supply-side gear cover 83 is mounted on the right side wall 36R from the right side thereof so that the detection end portion 95 of the new-product detection gear 82 is exposed through the new-product detection gear exposure opening 111. At this time, the screw holes 48 are also exposed through the corresponding right screw insertion through-holes 112. Next, two screw members 105 are inserted through the right screw insertion through-holes 112 and screwed into the corresponding screw holes 48 to fix the electric-power-supply-side gear cover 83 to the right side wall 36R. This completes the operation for assembling the electric-power supplying unit 33 on the right side wall 36R.

Figure 7B:
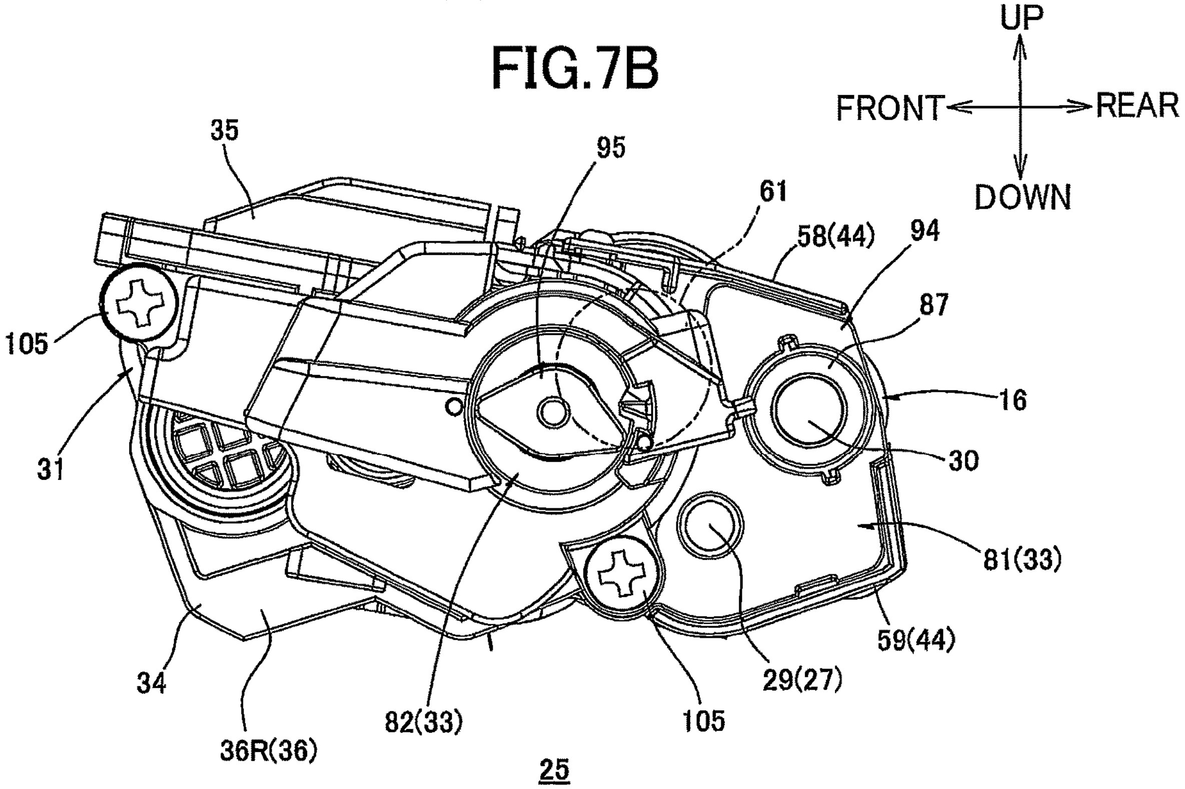
FIG. 7B is a right side view of the developing cartridge.

At this time, the top edge of the main part 94 constituting the electrode member 81 vertically confronts the upper flange part 58 of the right side wall 36R, as shown in FIG. 7B. Further, the lower portion on the rear edge of the main part 94 confronts the rear portion of the lower flange part 59 in the front-rear direction, and the bottom edge of the main part 94 vertically confronts the lower portion of the lower flange part 59. The portion of the electrode member 81 surrounding the screw through-hole 89 is interposed between the portion of the electric-power supply-side gear cover 83 surrounding the rear-side right screw insertion through-hole 112 and the portion of the right side wall 36R surrounding the rear-side screw hole 48.

Through the above process, the driving unit 32 and electric-power supplying unit 33 are assembled to the cartridge frame 31. At this time, the new-product detection gear 82 is positioned so that its upper rear edge overlaps the development coupling 61 when projected in the left-right direction, as shown in FIG. 7B.

4. Operations (1) As shown in FIGS. 4 and 5, the developing cartridge 25 includes the cartridge frame 31, bearing member 51, and electrode member 81. The bearing member 51 includes the coupling support shaft 56, and the electrode member 81 includes the detection-gear-supporting part 88. The development coupling 61 is supported by the coupling support shaft 56 so as to be capable of rotating relative thereto, and the new-product detection gear 82 is supported by the detection-gear-supporting part 88 so as to be capable of rotating relative thereto.

Through this construction, the development coupling 61 and new-product detection gear 82 can be disposed on the opposite side walls 36 (the left side wall 36L and right side wall 36R, respectively). Hence, the construction allows the cartridge frame 31 to be made more compact, making it possible to produce a more compact developing cartridge 25. That is, if the development coupling 61 and new-product detection gear 82 are on the same side wall 36 (the left side wall 36L or right side wall 36R), the side wall 36 needs to have an area large enough to be mounted with both of the development coupling 61 and new-product detection gear 82.

Further, since the bearing member 51 and electrode member 81 are provided separately from the cartridge frame 31, damage to the coupling support shaft 56 and detection-gear-supporting part 88 can be prevented when transporting the cartridge frame 31. Therefore, the above construction allows for a compact developing cartridge 25 while preventing damage to the coupling support shaft 56 and electrode member 81. More specifically, it is conceivable to mount the development coupling 61 and new-product detection gear 82 directly onto the side walls 36L and 36R. In such a case, support shafts need to protrude outwardly from the both side walls 36 to support the development coupling 61 and new-product detection gear 82. The support shafts will, however, possibly be damaged when the cartridge frame 31 is transported.

(2) When the developing cartridge 25 having this construction is projected in the left-right direction, the new-product detection gear 82 is positioned such that its upper rear edge overlaps the development coupling 61, as illustrated in FIG. 7B. Hence, the new-product detection gear 82 and development coupling 61 can be disposed at positions close to each other when projected in the left-right direction, thereby making it possible to produce a more compact developing cartridge 25.

(3) The bearing member 51 functions both to support the development coupling 61 and to rotatably support the left exposed part 74 of the developing roller shaft 30. The developing gear 62 that is engaged with the development coupling 61 is provided on the left exposed part 74. Since the relative positions of the development coupling 61 and left exposed part 74 (developing gear 62) can be maintained constant, the drive force inputted from the main casing 2 into the development coupling 61 can be transmitted reliably to the developing roller 16.

(4) The electrode member 81 is formed of an electrically conductive resin material, such as a conductive polyacetal resin. The main-casing-side electrode (not shown) supplies electric power to the detection-gear-supporting part 88 during the new-product detecting operation. Hence, by using the electrode member 81 to supply electric-power from the main-casing-side electrode to the detection-gear-supporting part 88, it is possible to reduce the number of required parts.

(5) As shown in FIGS. 4 and 5, the developing cartridge 25 includes the driving-side gear cover 53 and electric-power-supply-side gear cover 83. The driving-side gear cover 53 is fixed to the left side wall 36L for covering the development coupling 61 (excluding the coupling concave portion 68). The electric-power-supply-side gear cover 83 is fixed to the right side wall 36R for covering the new-product detection gear 82 (excluding the detection end portion 95).

As shown in FIG. 7A, the interposing part 109 of the driving-side gear cover 53 pinches the interposed part 108 of the bearing member 51 against the rear end of the left side wall 36L. Similarly, the portion of the electric-power supply-side gear cover 83 surrounding the rear-side right screw insertion through-hole 112 pinches the portion of the electrode member 81 surrounding the screw through-hole 89 against the lower end of the right side wall 36R.

Therefore, the bearing member 51 and the electrode member 81 can be reliably fixed to the cartridge frame 31, preventing the bearing member 51 and electrode member 81 from falling off the cartridge frame 31 and improving the accuracy in fixing the developing roller 16 relative to the cartridge frame 31.

(6) Further, while the bearing member 51 is fixed to the left side wall 36L, the top edge of the bearing member 51 vertically opposes the upper flange part 58 formed on the left side wall 36L. In addition, when the electrode member 81 is fixed to the right side wall 36R, the top edge of the main part 94 constituting the electrode member 81 vertically opposes the upper flange part 58 formed on the right side wall 36R, as shown in FIG. 7B. Additionally, the lower portion of the rear edge on the main part 94 opposes the rear portion of the lower flange part 59 in the front-rear direction, and the bottom edge of the main part 94 vertically opposes the lower portion of the lower flange part 59.

Accordingly, this construction restricts vertical movement of the bearing member 51 relative to the left side wall 36L and vertical and front and rear movement of the electrode member 81 relative to the right side wall 36R. As a result, this configuration can improve the accuracy in which the bearing member 51 and electrode member 81 are positioned relative to the side walls 36.

(7) As shown in FIG. 6B, the electrode member 81 includes the developing roller shaft collar 87. As shown in FIG. 3, the developing roller shaft collar 87 functions to cover the right exposed part 75 of the developing roller shaft 30. Accordingly, the developing roller shaft support through-hole 84 and developing roller shaft collar 87 can reliably support the right exposed part 75, thereby further improving the accuracy in positioning the developing roller 16 relative to the side walls 36.

5. Second Embodiment

Figure 8A:
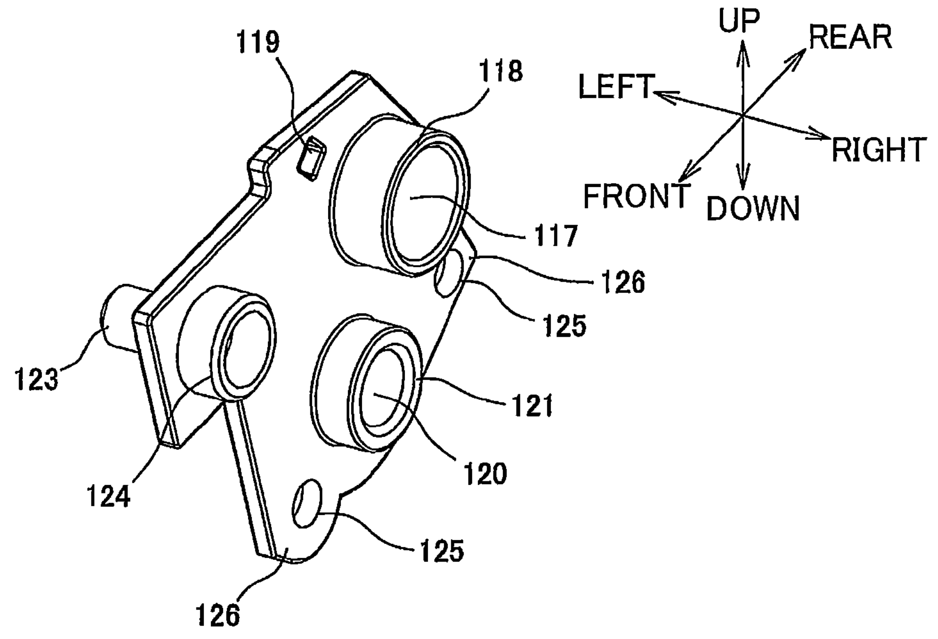
FIG. 8A is a perspective view from an upper right side of a bearing member (electrode member) provided in a developing cartridge according to a second embodiment.
Figure 8B:
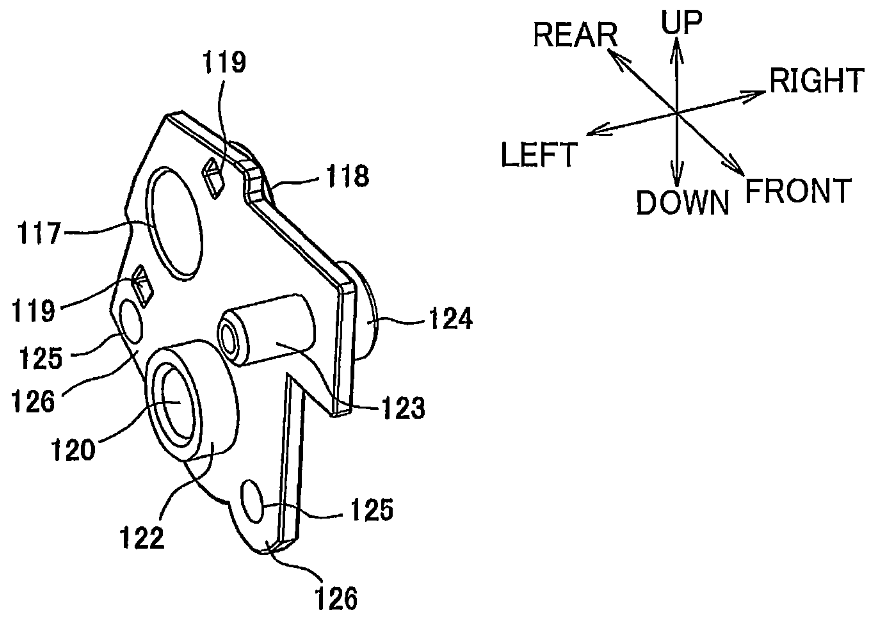
FIG. 8B is a perspective view from an upper left side of the bearing member (electrode member) shown in FIG. 8A.
Figure 9:
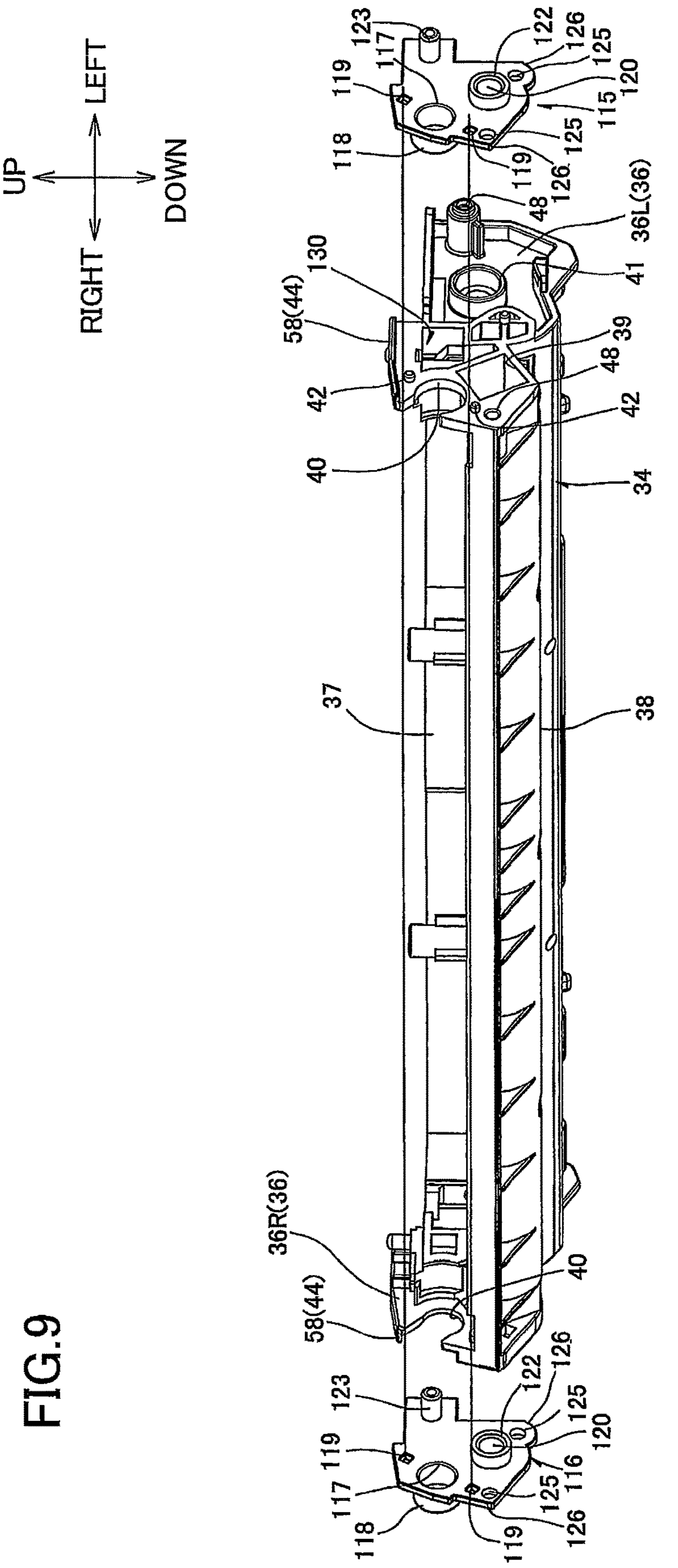
FIG. 9 is an explanatory diagram illustrating the positional relationship among a first frame, the bearing member, and the electrode member in the developing cartridge of the second embodiment.
Figure 10:
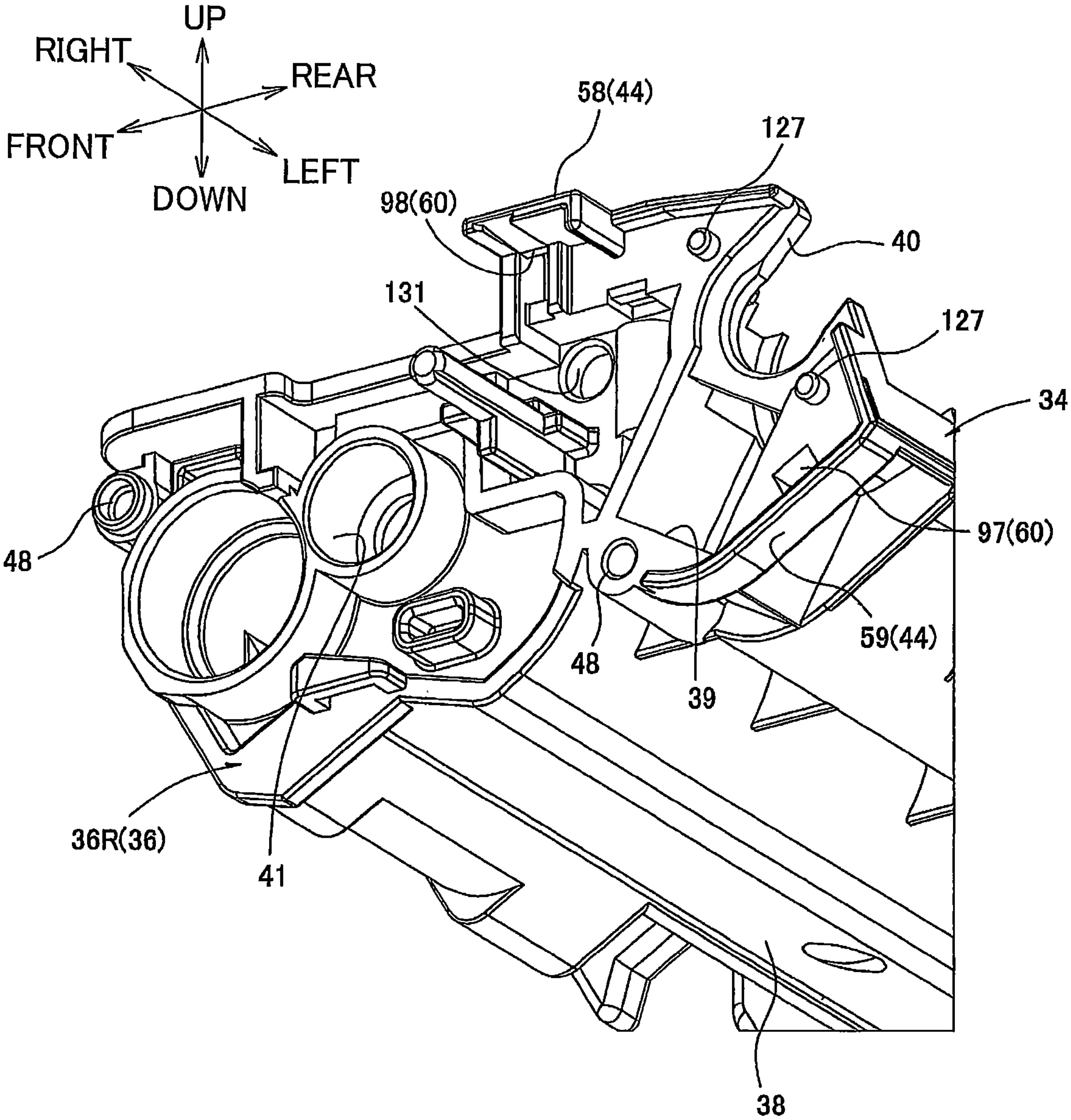
FIG. 10 is a perspective view from a lower right side of a right-side wall constituting the first frame shown in FIG. 9.

Next, a second embodiment of the present invention will be described. FIG. 8A is a perspective view from the upper right side of a bearing member (electrode member) provided in the developing cartridge according to the second embodiment, and FIG. 8B is a perspective view from the upper left side of the bearing member. FIG. 9 is an explanatory diagram illustrating the positional relationship between the first frame and the bearing member (electrode member) in the developing cartridge of the second embodiment. FIG. 10 is a perspective view from the lower right side of the right side wall constituting the first frame shown in FIG. 9. In FIGS. 8 through 10, like parts and components to those described in FIGS. 1 through 7 are designated with the same reference numerals to avoid duplicating description.

(5-1) Bearing Member (Electrode Member)

As described with reference to FIGS. 4 and 5 in the first embodiment, the bearing member 51 and electrode member 81 are formed in different shapes. However, as illustrated in FIGS. 8A, 8B, and 9 of the second embodiment, a bearing member 115 and an electrode member 116 are formed in the same shape using the same casting mold.

The bearing member 115 (electrode member 116) is made of a conductive resin material (e.g., conductive polyacetal resin). As shown in FIGS. 8A and 8B, the bearing member 115 (electrode member 116) is formed substantially in the shape of a rectangular plate when viewed from the side.

The bearing member 115 (electrode member 116) is formed with a developing roller shaft support through-hole 117, a pair of bearing-side through-holes 119, a supply roller shaft support through-hole 120, and a pair of screw through-holes 125.

The developing roller shaft support through-hole 117 is located in the upper rear end portion of the bearing member 115 and penetrates the bearing member 115. The developing roller shaft support through-hole 117 is substantially in a circular shape when viewed from the side. The inner diameter of the developing roller shaft support through-hole 117 is substantially equal to or slightly larger than the outer diameter of the left exposed part 74 and the right exposed part 75 in the developing roller shaft 30.

The pair of bearing-side through-holes 119 are formed on diametrically opposing sides of the developing roller shaft support through-hole 117 at positions corresponding to a pair of wall-side protruding parts 127 (to be described later). More specifically, one bearing-side through-hole 119 is formed above the developing roller shaft support through-hole 117 and the other below the developing roller shaft support through-hole 117, as shown in FIG. 9. The bearing-side through-holes 119 have a generally rectangular shape in a side view and penetrate the bearing member 115 in the left-right direction.

The supply roller shaft support through-hole 120 is located on the front lower side of the developing roller shaft support through-hole 117 and penetrates the bearing member 115. The supply roller shaft support through-hole 120 is substantially in a circular shape when viewed from the side. The inner diameter of the supply roller shaft support through-hole 120 is substantially equal to or slightly larger than the outer diameter of the supply roller shaft 29.

Two of the screw through-holes 125 are formed in the bearing member 115 (electrode member 116) at positions corresponding to the rear-side screw hole 48 in the left side wall 36L and the rear-side screw hole 48 in the right side wall 36R. Specifically, the screw through-holes 125 are formed in the lower end portion of the bearing member 115 at its front and rear ends. The peripheral edge defining each screw through-hole 125 serves as an interposed part 126.

A left supply-roller-shaft collar 122 and a coupling support shaft 123 are provided on the left surface of the bearing member 115 (electrode member 116).

The left supply-roller-shaft collar 122 is formed substantially in the shape of a cylinder that protrudes leftwardly from the peripheral edge of the supply roller shaft support through-hole 120.

The coupling support shaft 123 is located on the front upper side of the left supply-roller-shaft collar 122. The coupling support shaft 123 is substantially in a columnar shape and protrudes leftwardly from the left surface of the bearing member 115. The left supply-roller-shaft collar 122 and coupling support shaft 123 are integrally formed with the bearing member 115 (electrode member 116).

Provided on the right surface of the bearing member 115 (electrode member 116) are a developing roller shaft collar 118, a right supply-roller-shaft collar 121, and a detection-gear-supporting part 124. The developing roller shaft collar 118, right supply-roller-shaft collar 121, and detection-gear-supporting part 124 are integrally formed with the bearing member 115 (electrode member 116).

The developing roller shaft collar 118 has a generally cylindrical shape and protrudes rightward from the peripheral edge of the developing roller shaft support through-hole 117. The developing roller shaft collar 118 is formed with an outer diameter that is approximately equal to the width (vertical dimension) of the developing roller shaft exposure groove 40 (see FIG. 9).

The right supply-roller-shaft collar 121 has a generally cylindrical shape and protrudes rightward from the peripheral edge of the supply roller shaft support through-hole 120 positioned to the lower front side of the developing roller shaft collar 118.

The detection-gear-supporting part 124 has a generally cylindrical shape and protrudes rightward from the right surface of the bearing member 115 at a position to the upper front side of the right supply-roller-shaft collar 121. The central axis of the detection-gear-supporting part 124 is aligned with the central axis of the coupling support shaft 123. The detection-gear-supporting part 124 is formed with a larger outer diameter than that of the coupling support shaft 123.

As shown in FIG. 9, the bearing member 115 is disposed with its right surface confronting the left surface of the left side wall 36L in the left-right direction, and the electrode member 116 is disposed with its left surface confronting the right surface of the right side wall 36R in the left-right direction. The detection-gear-supporting part 124 of the bearing member 115 has the same shape as the detection-gear-supporting part 124 of the electrode member 116, and the coupling support shaft 123 of the electrode member 116 has the same shape as the coupling support shaft 123 of the bearing member 115.

(5-2) First Frame

As shown in FIG. 9, a first accommodating through-hole 130 is formed in the left side wall 36L, which faces the bearing member 115 in the left-right direction. The first accommodating through-hole 130 is formed in the left side wall 36L on the front side of the developing roller shaft exposure groove 40 at a position corresponding to the detection-gear-supporting part 124. The first accommodating through-hole 130 is generally rectangular in a side view and penetrates the left side wall 36L. The first accommodating through-hole 130 is formed with vertical and front-rear dimensions substantially equal to the outer diameter of the detection-gear-supporting part 124.

As shown in FIG. 10, the right side wall 36R confronting the electrode member 116 in the left-right direction has the pair of wall-side protruding parts 127 formed thereon, and a second accommodating through-hole 131 formed therein.

The wall-side protruding parts 127 are provided on the right side wall 36R at positions on diametrically opposing sides of the developing roller shaft exposure groove 40. More specifically, one of the wall-side protruding parts 127 is disposed above the developing roller shaft exposure groove 40 and the other below the developing roller shaft exposure groove 40. The wall-side protruding parts 127 have a generally columnar shape and protrude rightward from the right surface of the right side wall 36R.

The second accommodating through-hole 131 is formed in the right side wall 36R at a position in front of the developing roller shaft exposure groove 40 and corresponding to the coupling support shaft 123. The second accommodating through-hole 131 is generally circular in a side view and penetrates the right side wall 36R. The second accommodating through-hole 131 is formed with an inner diameter substantially equal to the outer diameter of the coupling support shaft 123.

(5-3) Assembling the Bearing Member and Electrode Member to the First Frame

To assemble the bearing member 115 to the left side wall 36L, the left exposed part 74 is inserted through the developing roller shaft collar 118 and developing roller shaft support through-hole 117, and the left end of the supply roller shaft 29 is inserted through the supply roller shaft support through-hole 120 and left supply-roller-shaft collar 122 (see FIG. 4). Note that among the two screw holes 48, the rear-side screw hole 48 is exposed in one of the two screw through-holes 125, that is, a rear-side screw through-hole 125 that is located on the rear side in the bearing member 115. At this time, the wall-side protruding parts 42 of the left side wall 36L are engaged in the corresponding bearing-side through-holes 119. Further, the developing roller shaft collar 118 is accommodated in the developing roller shaft exposure groove 40, and the right supply-roller-shaft collar 121 is accommodated in the supply roller shaft exposure through-hole 39. The detection-gear-supporting part 124 is also fitted into the first accommodating through-hole 130. Through this operation, the bearing member 115 is fixed in position relative to the left side wall 36L.

After assembling the gear train 52 and driving-side gear cover 53 to the left side wall 36L in the same manner as in the first embodiment, one screw member 105 is inserted through the rear-side left screw insertion through-hole 90 and the corresponding screw through-hole 125 (rear-side screw through-hole 125) and screwed into the rear-side screw hole 48, and another screw member 105 is inserted through the front-side left screw insertion through-hole 90 and screwed into the front-side screw hole 48. As a result, the driving-side gear cover 53 is fastened to the left side wall 36L. Consequently, a rear-side interposed part 126 (peripheral edge defining the rear-side screw through-hole 125) is interposed between the portion of the left side wall 36L around the periphery of the rear-side screw hole 48 and the portion of the driving-side gear cover 53 around the periphery of the rear-side left screw insertion through-hole 90.

To assemble the electrode member 116 to the right side wall 36R, the right exposed part 75 is inserted through the developing roller shaft support through-hole 117 and developing roller shaft collar 118 and the right end of the supply roller shaft 29 is inserted through the left supply-roller-shaft collar 122 (see FIG. 5). Note that among the two screw holes 48, the screw hole 48 on the rear side is exposed in one of the two screw through-holes 125, that is, a front-side screw through-hole 125 that is located on the front side in the electrode member 116. At this time, the wall-side protruding parts 127 formed on the right side wall 36R (see FIG. 10) are engaged in the corresponding bearing-side through-holes 119. Further, the developing roller shaft collar 118 covers the right exposed part 75, and the left supply-roller-shaft collar 122 is accommodated in the supply roller shaft exposure through-hole 39. The coupling support shaft 123 is also fitted inside the second accommodating through-hole 131. Through this operation, the electrode member 116 is fixed in position relative to the right side wall 36R.

After assembling the new-product detection gear 82 and electric-power-supply-side gear cover 83 to the right side wall 36R in the same manner as the first embodiment, one screw member 105 is inserted through the rear-side right screw insertion through-hole 112 and the corresponding screw through-hole 125 (front-side screw through-hole 125) and screwed into the rear-side screw hole 48, and another screw member 105 is inserted through the front-side right screw insertion through-hole 112 and screwed into the front-side screw hole 48. As a result, the electric-power-supply-side gear cover 83 is fastened to the right side wall 36R. Consequently, a front-side interposed part 126 (peripheral edge defining the front-side screw through-hole 125) is interposed between the portion of the right side wall 36R around the periphery of the rear-side screw hole 48 and the portion of the electric-power-supply-side gear cover 83 around the periphery of the rear-side right screw insertion through-hole 112.

Through the above process, the bearing member 115 and electrode member 116 are fixed to the first frame 34. At this time, the bearing member 115 and electrode member 116 having the same shape are perfectly overlapped when projected in the left-right direction, as illustrated in FIG. 9. In other words, corresponding parts of the bearing member 115 and electrode member 116 overlap each other in the left-right direction.

More specifically, when the bearing member 115 and electrode member 116 are projected in the left-right direction, the developing roller shaft support through-hole 117 of the bearing member 115 is aligned with the developing roller shaft support through-hole 117 of the electrode member 116, and the bearing-side through-holes 119 of the bearing member 115 is aligned with the bearing-side through-holes 119 in the electrode member 116. In other words, when the bearing member 115 and electrode member 116 are projected in the left-right direction, the bearing-side through-holes 119 formed in both the bearing member 115 and electrode member 116, the wall-side protruding parts 42 formed on the left side wall 36L, and the wall-side protruding parts 127 formed on the right side wall 36R are respectively aligned.

6. Operations (1) As shown in FIGS. 8A, 8B, and 9, the bearing member 115 and electrode member 116 are formed in the shape from the same casting mold, thereby reducing the costs for manufacturing the bearing member 115 and electrode member 116 and, hence, reducing the overall manufacturing cost of the developing cartridge 25.

(2) The bearing member 115 and electrode member 116 have the same shape and are perfectly aligned when projected in the left-right direction. That is, corresponding parts of the bearing member 115 and electrode member 116 are aligned with each other when projected in the left-right direction. More specifically, the developing roller shaft support through-holes 117 of the bearing member 115 overlap the developing roller shaft support through-holes 117 of the electrode member 116, and the bearing-side through-holes 119 of the bearing member 115 overlap the bearing-side through-holes 119 of the electrode member 116 when the bearing member 115 and electrode member 116 are projected in the left-right direction.

Hence, this configuration fixes the positions of the bearing member 115 and electrode member 116 accurately relative to the side walls 36 and further supports the developing roller 16 with precision. As a result, this construction can improve the precision in positioning the developing roller 16 relative to the side walls 36.

(3) As shown in FIG. 9, the bearing member 115 is positioned to confront the left side wall 36L in the left-right direction, while the electrode member 116 is positioned to confront the right side wall 36R in the left-right direction. Since the developing roller shaft 30 is rotatably supported in the side walls 36, this configuration can improve the precision in positioning the developing roller 16 relative to the first frame 34.

(4) Further, the detection-gear-supporting part 124 of the bearing member 115 is fitted into the first accommodating through-hole 130 formed in the left side wall 36L, and the coupling support shaft 123 of the electrode member 116 is fitted into the second accommodating through-hole 131 formed in the right side wall 36R. Hence, through a simple construction, it is possible to reliably mount the bearing member 115 and electrode member 116 on the side walls 36 and to accurately position the bearing member 115 and electrode member 116 relative to the side walls 36. Thus, this construction can improve the precision for positioning the developing roller 16 relative to the side walls 36.

The detection-gear-supporting part 124 and coupling support shaft 123 are integrally formed on the bearing member 115 and electrode member 116. By fitting the detection-gear-supporting part 124 into the first accommodating through-hole 130, the bearing member 115 can be positioned relative to the left side wall 36L. Similarly, by fitting the coupling support shaft 123 into the second accommodating through-hole 131, the electrode member 116 can be positioned relative to the right side wall 36R.

Hence, the bearing member 115 and electrode member 116 can be fixed in position relative to the corresponding side walls 36 by integrally forming the detection-gear-supporting part 124 and coupling support shaft 123 on the bearing member 115 and electrode member 116. Accordingly, this construction can improve the precision in positioning the bearing member 115 and electrode member 116 relative to the side walls 36.

In the second embodiment, the first accommodating through-hole 130 penetrates the left side wall 36L. However, instead of the first accommodating through-hole 130, a depression may be formed on the left side surface of the left side wall 36L in such a size and shape that can receive the detection-gear-supporting part 124 therein. In other words, it is sufficient that the left side wall 36L is formed with a hole (first accommodating hole) for receiving the detection-gear-supporting part 124 therein, regardless of whether or not the hole penetrates the left side wall 36L.

Similarly, in the second embodiment, the second accommodating through-hole 131 penetrates the right side wall 36R. However, instead of the second accommodating through-hole 131, a depression may be formed on the right side surface of the right side wall 36R in such a size and shape that can receive the coupling support shaft 123 therein. In other words, it is sufficient that the right side wall 36R is formed with a hole (second accommodating hole) for receiving the coupling support shaft 123 therein, regardless of whether or not the hole penetrates the right side wall 36R.

While the invention has been described in detail with reference to the embodiments thereof, it would be apparent to those skilled in the art that various changes and modifications may be made therein without departing from the spirit of the invention.

What is claimed is:

1. A developing cartridge comprising:

a housing configured to accommodate developing material therein, the housing having a first side and a second side separated from the first side in a first direction;

a supply roller rotatable about a first axis extending in the first direction, the supply roller being positioned at one side of the housing in a second direction, the supply roller including a supply roller shaft;

a coupling rotatable about a second axis extending in the first direction, the coupling being positioned at the first side of the housing;

a first shaft extending outwardly relative to the first side of the housing, the coupling being rotatable about the first shaft;

a second shaft extending in the first direction, the second shaft being positioned at the second side of the housing;

a tooth movable relative to the second shaft, the tooth being positioned at the second side of the housing;

a detection protrusion positioned at the second side of the housing, the detection protrusion being movable according to the movement of the tooth; and an electrode positioned at the second side of the housing, the electrode being electrically connected to the supply roller shaft, a portion of the electrode being positioned between the supply roller shaft and the detection protrusion in the second direction.

2. The developing cartridge according to claim 1, wherein the electrode is made of conductive resin.

3. The developing cartridge according to claim 1, further comprising:

a developing roller including a developing roller shaft, wherein the electrode has a first hole into which the developing roller shaft is inserted.

4. The developing cartridge according to claim 3, wherein the electrode has a second hole into which the supply roller shaft is inserted.

5. The developing cartridge according to claim 1, further comprising:

a developing roller rotatable about a third axis extending in the first direction, the developing roller including a developing roller shaft, wherein the electrode contacts the developing roller shaft in a state where the developing roller rotates about the third axis.

6. The developing cartridge according to claim 1, further comprising:

a developing roller including a developing roller shaft, wherein the developing roller shaft has a first end portion and a second end portion separated from the first end portion in the first direction, the first end portion being positioned at the first side of the housing, the second end portion being positioned at the second side of the housing; and wherein the second end portion is inserted through the electrode.

7. The developing cartridge according to claim 1, wherein the supply roller shaft has one end portion and another end portion in the first direction, the one end portion of the supply roller shaft being inserted through the electrode.

8. The developing cartridge according to claim 1, further comprising:

a developing roller including a developing roller shaft; and an agitator rotatable about a fourth axis extending in the first direction, the agitator including an agitator shaft, wherein the second shaft is positioned between the developing roller shaft and the agitator shaft in the second direction.

9. The developing cartridge according to claim 8, wherein the first shaft is positioned between the developing roller shaft and the agitator shaft in the second direction.

10. The developing cartridge according to claim 1, wherein the tooth is movable in response to rotation of the coupling.

11. The developing cartridge according to claim 1, further comprising:

a developing roller including a developing roller shaft; and a bearing positioned at the first side of the housing, wherein the developing roller shaft has a first end portion and a second end portion separated from the first end portion in the first direction, the first end portion being positioned at the first side of the housing, the second end portion being positioned at the second side of the housing; and wherein the first end portion is inserted through the bearing.

12. The developing cartridge according to claim 1, further comprising:

a developing roller including a developing roller shaft; and a developing gear mounted to the developing roller shaft and rotatable with the developing roller, the developing gear being positioned at the first side of the housing, wherein the coupling includes a gear part engaging with the developing gear.

13. The developing cartridge according to claim 1, further comprising:

a developing roller including a developing roller shaft, wherein the second direction is defined by connecting the developing roller shaft and the second shaft.

14. The developing cartridge according to claim 1, wherein the detection protrusion includes a detection end portion, the detection end portion being positioned at one end of the detection protrusion in the first direction.

15. The developing cartridge according to claim 14, wherein the detection end portion is rotatable.

16. The developing cartridge according to claim 1, wherein the electrode includes a main part which is formed in the shape of the rectangular plate and the second shaft.

17. The developing cartridge according to claim 16, wherein the second shaft is electrically connected to the main part.

18. The developing cartridge according to claim 17, wherein the second shaft extends from the main part.

19. The developing cartridge according to claim 1, further comprising:

a gear including the tooth, wherein the gear is rotatable about the second shaft.

20. The developing cartridge according to claim 19, wherein the detection protrusion is movable according to the rotation of the gear.

* * * * *